United States Patent
Emerson et al.

(10) Patent No.: US 12,535,807 B2
(45) Date of Patent: Jan. 27, 2026

(54) TRANSMITTING, TO A DISTRIBUTED CONTROL NODE (DCN), DEFAULT ALARM CONFIGURATION FILE(S) DETERMINED BASED ON A FUNCTION BLOCK TYPE

(71) Applicant: Yokogawa Electric Corporation, Tokyo (JP)

(72) Inventors: David Emerson, Coppell, TX (US); Patrick Clay, Frisco, TX (US); Vien Nguyen, Frisco, TX (US); Hidenori Sawahara, Spring, TX (US)

(73) Assignee: Yokogawa Electric Corporation, Tokyo (JP)

( * ) Notice: Subject to any disclaimer, the term of this patent is extended or adjusted under 35 U.S.C. 154(b) by 471 days.

(21) Appl. No.: 18/090,326

(22) Filed: Dec. 28, 2022

(65) Prior Publication Data
US 2024/0219898 A1  Jul. 4, 2024

(51) Int. Cl.
G05B 23/02 (2006.01)
(52) U.S. Cl.
CPC ........ G05B 23/027 (2013.01); *G05B 2223/02* (2018.08)
(58) Field of Classification Search
CPC .......................... G05B 23/027; G05B 2223/02
USPC ......................................................... 340/506
See application file for complete search history.

(56) References Cited

U.S. PATENT DOCUMENTS

| | | | |
|---|---|---|---|
| 6,205,362 B1 * | 3/2001 | Eidson | G05B 19/0421 706/45 |
| 7,551,072 B2 | 6/2009 | Tambascio et al. | |
| 10,410,493 B2 | 9/2019 | Rischar et al. | |
| 11,650,892 B1 | 5/2023 | Joyner | |
| 2008/0124877 A1 | 5/2008 | Pei | |
| 2012/0310381 A1 * | 12/2012 | Karaffa | G05B 19/418 700/80 |

(Continued)

FOREIGN PATENT DOCUMENTS

| | | |
|---|---|---|
| CN | 111416731 | 7/2020 |
| CN | 111508214 | 8/2020 |

(Continued)

OTHER PUBLICATIONS

Japanese Patent Office: Notice of Allowance issue for Application No. 2023-222846, 6 pages, dated Feb. 12, 2025.

(Continued)

*Primary Examiner* — Kerri L McNally
(74) *Attorney, Agent, or Firm* — Gray Ice Higdon

(57) ABSTRACT

Implementations transmit, to a distributed control node (DCN), default alarm configuration file(s) that are determined based on a particular type of function block. Those implementations transmit the default alarm configuration file(s) to the DCN based on determining that the DCN is executing a function block that is of the particular type and/or is utilizing a function block, that is of the particular type, in alarm monitoring. A default alarm configuration file that is transmitted to a DCN can be stored locally at the DCN to enable viewing and/or editing thereof via human-machine interface (HMI) interfacing with the DCN. Implementations additionally or alternatively relate to reflecting, in an alarms database accessible via a process automation network, local updates that are made via an HMI to a default alarm configuration file locally stored at a DCN.

20 Claims, 8 Drawing Sheets

(56) References Cited

U.S. PATENT DOCUMENTS

| | | |
|---|---|---|
| 2016/0065656 A1* | 3/2016 | Patin ................... H04L 67/10 |
| | | 709/201 |
| 2018/0077109 A1 | 3/2018 | Hoeme et al. |
| 2018/0109955 A1 | 4/2018 | Nixon et al. |
| 2019/0102401 A1 | 4/2019 | Neel et al. |
| 2019/0355228 A1 | 11/2019 | Rischar et al. |
| 2021/0064004 A1 | 3/2021 | Kurokawa |
| 2022/0011756 A1* | 1/2022 | Hoernicke .......... G06F 9/44542 |
| 2022/0086037 A1 | 3/2022 | Gehberger et al. |
| 2022/0303338 A1* | 9/2022 | Nguyen ............... H04L 41/082 |
| 2022/0308542 A1* | 9/2022 | Clay .................. H04L 41/0806 |
| 2022/0308555 A1* | 9/2022 | Malm ............... G05B 19/41845 |
| 2022/0311700 A1 | 9/2022 | Wang et al. |

FOREIGN PATENT DOCUMENTS

| | | |
|---|---|---|
| JP | 11327636 | 11/1999 |
| JP | 2002055713 | 2/2002 |
| JP | 2002062933 | 2/2002 |
| JP | 2002149232 | 5/2002 |
| JP | 2005531826 | 10/2005 |
| JP | 2011265206 | 12/2011 |
| JP | 2014032672 | 2/2014 |

OTHER PUBLICATIONS

Japanese Patent Office: Notice of Refusal issued for Application No. 2023-222846, 8 pages, dated Dec. 3, 2024.

* cited by examiner

TRANSMITTING, TO A DISTRIBUTED CONTROL NODE (DCN), DEFAULT ALARM CONFIGURATION FILE(S) DETERMINED BASED ON A FUNCTION BLOCK TYPE

BACKGROUND

Alarms are utilized in process automation systems to detect potential anomalies and to cause action(s) to be performed responsive to detecting a potential anomaly. A potential anomaly can be one with the process automation system and/or one with the process automation process for which the process automation system is deployed. The action(s) for an alarm can include, for example, causing a corresponding notification to be rendered at interface(s) monitored by operator(s) and/or automatically causing remediation(s) to be performed (e.g., an automation process or sub-process automatically halted or throttled). As an example, an alarm can be configured to monitor sensor readings, from a sensor of the process automation system, and to cause a corresponding notification to be rendered if the sensor readings are above a high value (and/or a high-high value) and/or are below a low value (and/or a low-low value).

In some process automation systems, hardware and/or software of process automation control nodes, of the process automation system, can all be supplied and/or managed by a single entity (e.g., a single company). This enables the single entity to utilize its own proprietary techniques to create and manage alarms that are associated with corresponding process automation control nodes.

However, other process automation systems include heterogeneous hardware and/or heterogeneous software that are supplied and/or managed by a plurality of entities and/or that are deployed in a distributed manner. For example, a process automation system can include some process automation control nodes that are supplied and/or managed by a first entity, other process automation control nodes that are supplied and/or managed by a second entity, etc. Each process automation control node can have different hardware and/or software specifications, including different function block(s) that define control(s) performed by the process automation control node.

A process automation control node can include a distributed control node (DCN) that includes hardware (e.g., processor(s), memory, network interface(s), input and/or output port(s), and/or other hardware) as well as software (e.g., function block(s)) that is executed by at least some of the hardware. For example, the software can be included in memory of the DCN and can be executed by processor(s) of the DCN. The software of a DCN can, for example, utilize data from input port(s) of the DCN and/or data from other DCN(s) during execution and/or can generate output for providing over output port(s) and/or a network interface (e.g., transmitting to one or more endpoint(s) via a process automation network of the process automation system).

SUMMARY

Various technical challenges are presented in generating, updating, and/or deploying process automation alarms in a process automation system that includes distributed and/or heterogeneous hardware and/or software. For example, a process automation alarm can require monitoring, by an alarm engine, of process variable(s) of particular function block(s), such as input variable(s), output variable(s), and/or internal variable(s) of the particular function block(s). The DCN(s) generating and/or enabling access to process variable(s) must be accessible to the alarm engine to enable monitoring of those process variable(s) by the alarm engine. Further, the alarm engine must have access to and utilize appropriate alarm configuration file(s) in monitoring for occurrence of corresponding alarm condition(s) and causing corresponding action(s) to occur in response. An alarm configuration file can define condition(s), for corresponding process variable(s) that, when satisfied, cause the alarm engine to initiate corresponding action(s). Yet further, when the action(s) include initiating rendering (e.g., visual and/or audible rendering) of corresponding output at an alarm viewer, establishment of a connection-oriented connection between the alarm engine and the alarm viewer may be required or desired.

However, due to the distributed and/or heterogeneous nature of the process automation system, achieving one or more of the desires and/or requirements mentioned above or elsewhere herein can be cumbersome and/or error prone. As one example, assume that an alarm configuration file is locally stored on a particular DCN and is being utilized, by a local alarm engine of the particular DCN, in monitoring process variable(s) of a particular function block on the particular DCN (e.g., monitoring values for those variable(s) during execution of the particular function block). Further assume that the alarm configuration file is locally stored and utilized by the particular DCN based on being pre-loaded on the particular DCN (prior to commissioning of the DCN in the process automation system) or based on being fully manually configured via a human-machine interface (HMI) coupled to the DCN during commissioning. If the particular DCN is replaced with a new DCN, executing the same function block(s), it can require manual pre-loading of the alarm configuration file on the new DCN or manually configuring the new DCN via the HMI. Likewise, if the particular function block and/or the alarm engine are removed from the particular DCN and newly implemented on an alternative DCN, manual reassigning of the alarm configuration file to the alternate DCN can be required. In addition to manual reassigning being cumbersome and requiring utilization of computing resource(s), error(s) in the manual reassigning can result in corresponding alarm(s) not being truly active or not being accurate (e.g., due to incorrect value(s) being defined). This results in lack of monitoring for occurrence of the condition(s) of the alarm(s), and lack of any corresponding action(s) being taken—which can result in hazardous conditions or other negative consequences in the process automation setting.

These and/or other challenges can be exacerbated when there is a desire to be able to configure a process automation alarm locally at a DCN. For example, there can be a desire to enable employees or contractors at a process automation facility to configure a process automation alarm, for a function block, through user interactions with a human-machine interface (HMI) that interfaces directly with the DCN. The HMI can interface directly with the DCN via a wired or wireless connection with the DCN and, optionally, after authentication (e.g., using a username and/or password) is performed via input(s) to the HMI. For instance, there can be a desire to be able to locally specify value(s) that define condition(s) for the process automation alarm and/or to locally specify value(s) of other parameter(s) for the process automation alarm (e.g., alarm sensitivity value(s), content of alarm message(s), and/or value(s) for other parameter(s)). However, those local adaptations that are made via interaction with a given DCN may not be reflected in a new DCN that replaces the given DCN and/or if the function block is removed from the given DCN and implemented in an alternate DCN. Further, those local specification may not be reflected at a central database that may be used by a non-local alarm configuration GUI that enables viewing and/or editing of all alarms of the system.

Implementations disclosed herein address these and other challenges by automatically deploying, to a DCN, default alarm configuration file(s). Those implementations, in automatically deploying a default alarm configuration file to the DCN, determine the default alarm configuration file based on a function block type of a function block that is executed by the DCN and/or that is utilized by a local alarm engine of the DCN in alarm monitoring. For example, for an "AO" function block type, default alarm configuration files can include those for "error", "level", "rate of change", and "deviation" alarm types, while omitting e.g., any "discrete", "answerback inconsistency", and/or "answerback error" alarm type(s). As another example, for a "DI" function block type, default alarm configuration files can include those for "error" and "discrete state" alarm types, while omitting e.g., any "rate of change", "level", "deviation", "answerback inconsistency", and/or "answerback error" alarm type(s).

As referenced above, a default alarm configuration file that is deployed to a DCN can be deployed to the DCN responsive to determining that the DCN executes a function block that is of a particular type that corresponds to the default alarm configuration file and/or determining that the DCN implements alarm monitoring based on a function block that is of the particular type. For example, the DCN can transmit, via a process automation network and to an alarm configuration service, an alarm configuration request that includes function block identifier(s) of function block(s) that are executed by the DCN and/or that are utilized in alarm monitoring by the DCN. The alarm configuration service can determine function block type(s) based on the function block identifier(s) of the alarm configuration request. Further, in response to the request the alarm configuration service can transmit, to the DCN, default alarm configuration file(s) for those function block type(s).

As one example, a given function block can have a function block identifier of "FT101.PV". The function block identifier "FT101.PV" can be generated by a programmer of the given function block when creating the given function block, or can be automatically created, and can be created or generated so that it is unique relative to all other function block identifiers of all other function blocks of the process automation system. Further, part of the function block identifier can indicate a type of the function block and can conform to a standardized type designation scheme. For example, "PV" in "FT101.PV" can indicate the function block is of a "process variable" type. Also, for example, ".AI" can indicate a function block of an "analog input" type, ".AO" can indicate a function block of an "analog output" type, and/or ".PID" can indicate a function block of a "proportional-integral-derivative" type. In some of those or other implementations, at least part of the function block identifier may not conform to any standardized designation scheme, but may be semantically meaningful and/or conform to a non-standardized designation scheme of programmer(s) and/or an entity (or entities) implementing the process automation system. "FT101", in "FT101.PV", is an example of such a part of a function block identifier. For example, in a process automation system there may be multiple function block identifiers that end in ".PV". However, only one of those will include "FT101" before the ".PV" and, further, all of those will include unique character(s), relative to one another, before the ".PV".

Accordingly, in various implementations the alarm configuration service can determine function block type(s) that are implemented by a DCN through processing of function block identifier(s) that are included in an alarm configuration request from the DCN. For example, the alarm configuration service can determine a function block type that is utilized by the DCN based on the suffix of a function block identifier (e.g., the portion that follows ".") that is included in an alarm configuration request from the DCN A default alarm configuration file determined based on a function block type can include condition(s) for a corresponding alarm type, but can include default value(s) or no value(s) for the condition(s). For example, for an "analog input" function block type, a default alarm configuration file can include condition(s) for a "level" alarm type, such as high-high, high, low, and low-low setpoint conditions. However, the default alarm configuration file can include, for each of those conditions, a corresponding default value or no value. Rather, and as described herein, the values for those conditions can be later specified via interactions with an HMI that is coupled to a DCN to which the default alarm configuration file is provided and locally stored.

In some implementations or situations, such as when access to a corresponding function block is available when determining a default alarm configuration file, the default alarm configuration file can include actual process variable(s) to which the condition(s) pertain. In some alternative implementations or situations, the default configuration file can include placeholder process variable(s) and/or no process variable(s). Rather, those can be later specified via interactions with an HMI that is coupled to a DCN to which the default alarm configuration file is provided and locally stored. Default alarm configuration file(s) can include additional and/or alternative parameter(s), optionally with default value(s) and/or no value(s) defined. For example, a default alarm configuration file can specify a default severity level (e.g., a default level that is defined for the function block type and/or the alarm type) and/or can specify default message(s) to be rendered in an alarm viewer responsive to corresponding condition(s) being satisfied (e.g., default message(s) that are define for the function block type and/or the alarm type).

A default alarm configuration file that is transmitted to a DCN can be stored locally at the DCN to enable viewing and/or editing thereof via an HMI interfacing with the DCN. For example, the HMI can at least temporarily interface with the DCN via a wired connection (e.g., via I/O(s) of the DCN) or wireless connection, such as a wireless BLUETOOTH connection. The default alarm configuration file that is locally stored at the DCN can have a disabled flag initially, which will prevent implementation thereof by an alarm engine of the DCN. The default alarm configuration file that is locally stored at the DCN can also initially lack value(s) for condition(s) and/or other parameter(s) and/or can include initial default value(s) for parameter(s). When an HMI interfaces with the DCN, the HMI can enable viewing, editing, and/or deleting of the default alarm configuration file. Further, any disabled flag for the default alarm configuration file can be removed, or changed to an enabled flag, after the alarm configuration file is updated (and the update optionally confirmed) via the HMI or after the default alarm configuration file is confirmed via the HMI. Once a disabled flag for the optionally updated default alarm configuration file is removed, or changed to an enabled flag, local alarm monitoring at the DCN and based on the optionally updated default alarm configuration file can commence.

By providing the default alarm configuration file according to implementations disclosed herein, an operator can edit the default alarm configuration file (e.g., value(s) for parameter(s) thereof) via the HMI with limited user interface inputs and in a more efficient manner than if the alarm configuration file were instead created from scratch via the HMI. Further, for alarm configuration files that an operator does not want to implement, they can be easily deleted via the HMI or left in a disabled state. Yet further, various implementations provide a default alarm configuration file to a DCN during commissioning of the DCN, without requiring preloading of the default configuration files to the DCN and/or provide only default configuration files that are relevant to function block(s) executed by the DCN and/or utilized in alarm monitoring by the DCN, preventing wasting of DCN memory in storing irrelevant default configuration file(s).

Implementations disclosed herein additionally or alternatively relate to reflecting, in an alarms database accessible via a process automation network, local updates that are made via an HMI to a default alarm configuration file locally stored at a DCN. For example, storing, in the alarms database, an updated alarm configuration file that is based on a default alarm configuration file transmitted to a DCN, but that includes modification(s) to the default alarm configuration file—where those modification(s) are responsive to input(s) received via an HMI coupled with the DCN. Further, those implementations can also store, in the alarms database, an association of the updated alarm configuration file with a function block identifier of the function block to which it pertains. The assignment of an updated alarm configuration file to the function block identifier can be in addition to (or in lieu of) any assignment of the alarm to a DCN identifier of the DCN that locally stores and locally utilizes the updated alarm configuration file. For example, a given function block can have an identifier of "FT101.PV", which can be generated by programmer of the given function block and can be unique relative to all other function blocks of the system. Further, an updated default alarm configuration file for alarm monitoring based on the given function block can be stored in the alarms database and an association between "FT101.PV" and the updated default alarm configuration file can also be stored in the alarms database.

For example, the DCN can transmit, to an alarm configuration service that manages the alarms database, an alarm configuration update that includes any updated alarm configuration file(s) modified locally at the DCN, along with the function block identifier(s) to which the updated alarm configuration file(s) pertain. The DCN can send such a transmission responsive to the local modification at the DCN. This enables the alarm configuration service to update the alarms database to reflect the modification. This can enable viewing of the updated alarm configuration file by a non-local alarm configuration graphical user interface (GUI) and, optionally, further modification of the updated alarm configuration file via the non-local alarm configuration GUI (and subsequent provision of the further modified alarm configuration file to the DCN). Further, by storing the alarm configuration file in association with the function block identifier, a new or alternate DCN, that later implements the function block in lieu of the original DCN, can be provided with the updated alarm configuration file instead of being provided with a corresponding default alarm configuration file. For example, the new or alternate DCN can provide an alarm configuration request, that includes the function block identifier, to the alarm configuration service. The alarm configuration service can use the function block identifier of the request to identify the alarm configuration file from the alarm database, and return the identified alarm configuration file to the DCN for implementation. If there is not any alarm configuration file stored in association with the function block identifier, default alarm configuration file(s), for a type of the function block, can be provided as described above.

An alarm configuration service can be implemented on one or more server(s) coupled to the process automation network, and can manage the alarms database and/or interact with DCNs as described herein. The alarm configuration service can receive an alarm configuration request from a DCN and provide corresponding default alarm configuration file(s) in response. In some implementations, the alarm configuration service can first search the alarms database, based on DCN identifier(s) included in the alarm configuration request, to determine whether there are any specific (i.e., non-default) alarm configuration file(s) with stored association(s) to the DCN identifier(s). If so, the specific alarm configuration file(s) can be transmitted to the DCN in lieu of default alarm configuration file counterparts. For example, a specific alarm configuration file stored in association with a DCN identifier can be one provided via bulk upload, one defined via interaction with a non-local alarm configuration GUI, or one provided in a prior alarm configuration update (e.g., provided based on HMI-based modification of a default alarm configuration file). In these and other manners, a newly commissioned DCN (e.g., commissioned upon initial commissioning of the process automation system or commissioned to replace a removed DCN) can obtain appropriate default and/or specific alarm configuration file(s) utilizing only function block identifier(s) of function block(s) that are utilized by (e.g., executed by and/or assigned for use in alarm monitoring by) the newly commissioned DCN. Further, the alarm configuration service can optionally retrieve and provide the alarm configuration file(s) without any reference to an addressable DCN identifier of the particular DCN on which the given function block will be implemented.

Utilization of function block identifiers, in deploying alarms according to implementations disclosed herein, can enable alarm deployment that is robust in the distributed and/or heterogeneous process automation system setting and/or that mitigates errors in such a setting. For example, utilization of function block identifiers in determining which alarm configuration file(s) to provide in response to an alarm configuration request, can mitigate issues that might otherwise arise with old DCNs being replaced with new DCNs (with new DCN identifiers), alarm engine monitoring functionality being switched from a given DCN (with a given DCN identifier) to alternate DCN(s) (with alternate DCN identifier(s)), etc.

In various implementations, an alarm configuration request can be issued by a DCN responsive to the DCN detecting occurrence of one or more alarm configuration conditions. For example, an alarm configuration request can be issued by a DCN responsive to the DCN determining it is newly commissioned (e.g., newly added to the process automation system), determining it has been powered up (e.g., initially or after a restart), determining that its alarm engine is assigned to monitor function block(s) but that monitoring not being currently active (e.g., due to lacking any alarm configuration file(s) for the function block(s)), determining that is has been more than a threshold duration of time since it last issued an alarm configuration request, receiving an update request from the alarm configuration service, and/or detecting occurrence of other condition(s).

Causing a DCN to issue the alarm configuration request in response to detecting such certain condition(s) can ensure that the DCN proactively seeks alarm configuration file(s) in situation(s) where they are likely needed. Additionally or alternatively, by preventing issuance of an alarm configuration request by the DCN when the certain condition(s) are not detected, resources of the process automation system can be conserved. For example, network resources can be conserved such as those utilized in transmitting the alarm configuration request from the DCN to the alarm configuration service and/or those utilized by the alarm configuration service in responding to the alarm configuration request.

Accordingly, implementations disclosed herein enable effective deployment of alarm configuration files to appropriate process automation nodes as those process automation nodes are brought online in a newly commissioned process automation system. Further, implementations additionally or alternatively enable robust adaptation to replacement and/or modification of process automation nodes and/or other system component(s) in an active process automation system. For example, implementations enable robust alarm adaptation when a first DCN executing and/or monitoring first function blocks is replaced by a second DCN (e.g., with different hardware specification(s)) also executing and/or monitoring the first function blocks.

The above description is provided as an overview of some implementations of the present disclosure. Further description of those implementations, and other implementations, are described in more detail below.

In addition, some implementations include one or more processors of one or more devices, where the one or more processors are operable to execute instructions stored in associated memory, and where the instructions are configured to cause performance of any of the aforementioned methods. The processor(s) can include various hardware processors such as central processing unit(s) (CPU(s)), application-specific integrated circuit(s) (ASIC(s)), field-programmable gate array(s) (FPGA(s)), graphics processing unit(s) (GPU(s)), digital signal processor(s) (DSP(s)), and/or other processor(s). Some implementations additionally or alternatively include one or more transitory or non-transitory computer readable storage media storing computer instructions executable by one or more processors to perform any of the methods disclosed herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations disclosed herein relate to ensuring robust and/or accurate alarm monitoring based on function blocks implemented by DCNs of a process automation system. At least a subset of such function blocks are each utilized in implementing at least part of a corresponding at least partially automated process. As used herein, an "at least partially automated process" includes any process cooperatively implemented within a process automation system by multiple devices with little or no human intervention. One common example of an at least partially automated process is a process loop in which one or more actuators are operated automatically (without human intervention) based on output of one or more sensors. Some at least partially automated processes can be sub-processes of an overall process automation system workflow, such as a single process loop mentioned previously. Other at least partially automated processes can include all or a significant portion of an entire process automation system workflow. In some cases, the degree to which a process is automated can exist along a gradient, range, or scale of automation. Processes that are partially automated, but still require human intervention, may be at or near one end of the scale. Processes requiring less human intervention may approach the other end of the scale, which represents fully autonomous processes. Process automation in general may be used to automate processes in a variety of domains, e.g., manufacture, development, and/or refinement of chemicals (e.g., chemical processing), catalysts, machinery, and/or other domain(s).

Figure 1:
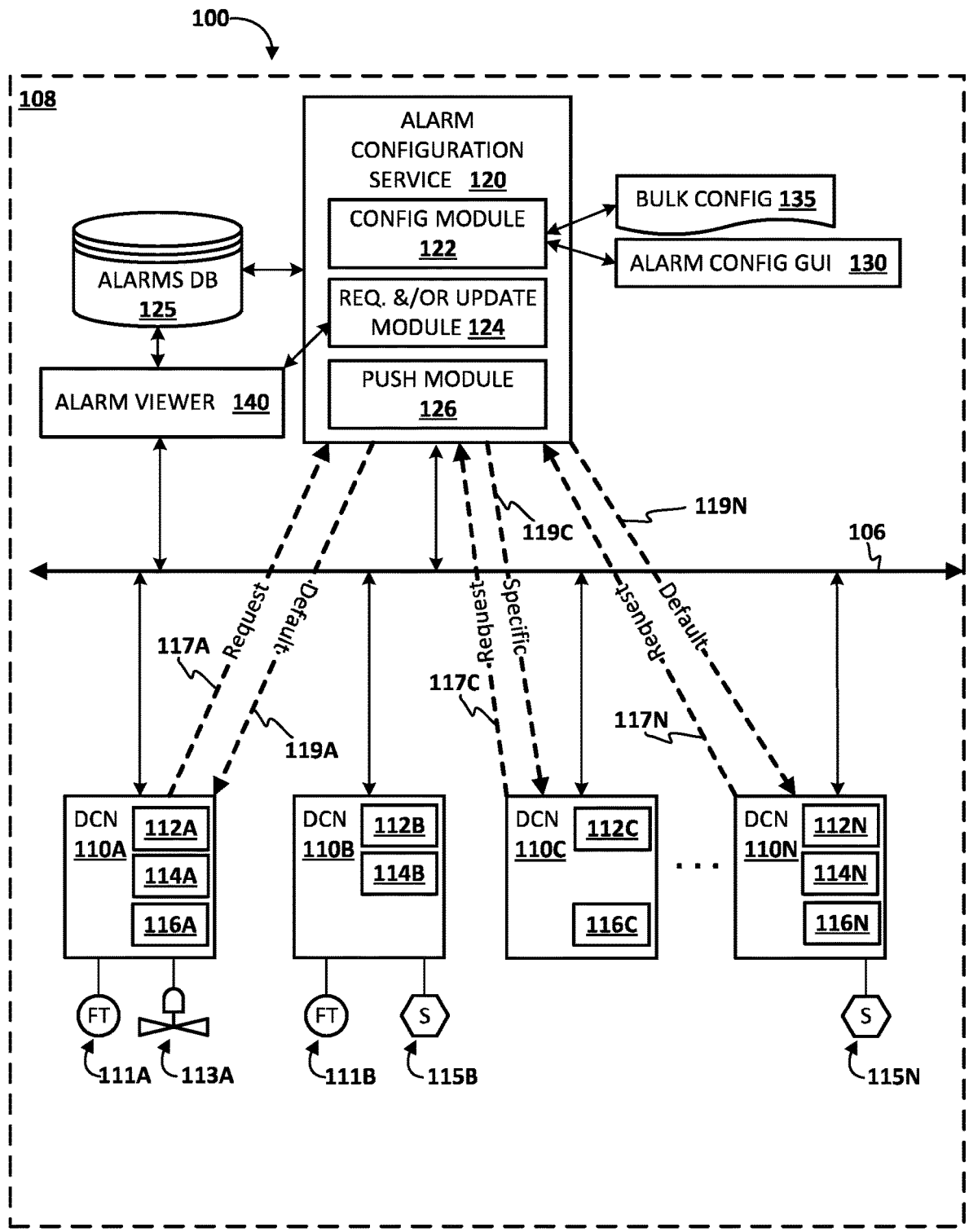
FIG. 1 illustrates an example environment in which selected aspects of the present disclosure can be implemented, in accordance with various implementations.

Referring now to FIG. 1, an example environment 100 in which various aspects of the present disclosure can be implemented is depicted schematically. Environment 100 includes a process automation system 108 that can be implemented in various industrial settings, such as part of a chemical processing plant, an oil or natural gas refinery, a catalyst factory, a manufacturing facility, or other industrial setting(s). Process automation system 108 is illustrated in FIG. 1 as including an alarm configuration service 120, an alarms database 125, a non-local alarm configuration graphical user interface (GUI) 130, an alarm viewer 140, a process automation network 106, and distributed control nodes (DCNs) 110A-110N. The process automation system 108 can include various additional components. However, those are not illustrated in FIG. 1 for the sake of simplicity.

Process automation network 106 can be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh). Process automation is often employed in scenarios in which the cost of failure tends to be large, both in human safety and financial cost to stakeholders. Accordingly, in various implementations, process automation network 106 can be configured with redundancies and/or backups to provide high availability (HA) and/or high quality of service (QOS). Additionally, nodes that exchange data over process automation network 106 can implement time-sensitive networking (TSN) to facilitate time synchronization and/or real-time control streams. Various nodes/devices are operably coupled with process automation network 106, such as alarm configuration service 120, alarm viewer 140, and DCNs 110A-N.

DCNs 110A, 110B, 110C, and 110N are illustrated in FIG. 1. However, it is noted that additional (e.g., hundreds of or even thousands of) DCN(s) can be provided in process automation system 108, as indicated by the ellipsis between DCN 110C and DCN 110N. Some DCNs in process automation system 108 can have input(s)/output(s) (I/O(s)) for coupling with sensor(s), HMI(s), actuator(s), and/or other components. Other DCN(s) in process automation system 108 can optionally omit I/O(s).

DCN 110A is coupled, via a first I/O, to a flow transmitter (FT) component 111A and, via a second I/O to an actuator (e.g., a valve) 113A. The actuator 113A, and other actuators described herein, can be an electric, hydraulic, mechanical, and/or pneumatic component that is controllable to affect some aspect of a process automation workflow that occurs at process automation facility 108. The FT component 111A includes sensor(s) that provide sensor data indicating flow rate of a corresponding fluid flow and also includes actuator(s) that can be adjusted to control the corresponding fluid flow. Sensors described herein can take various forms, including but not limited to a pressure sensor, a temperature sensor, a flow sensor, various types of proximity sensors, a light sensor (e.g., a photodiode), a pressure wave sensor (e.g., microphone), a humidity sensor (e.g., a humistor), a radiation dosimeter, a laser absorption spectrograph (e.g., a multi-pass optical cell), and/or other form(s).

DCN 110A includes processor(s) 112A that can utilize associated memory (and corresponding instructions stored therein) for implementing corresponding function(s) of the DCN 110A. Those function(s) include implementing function block(s) 114A of DCN 110A, which can be stored in some of the associated memory. Those function(s) also include implementing an alarm engine 116A.

Each of the function block(s) 114A of DCN 110A can define one or more aspects of sensor monitoring and/or actuator control that is performed by DCN 110A. In some implementations, each of the function block(s) 114A is a corresponding software model that contains input/output variable(s), through variable(s), internal variable(s), and/or an internal behavior description of the function(s) to be performed by the function block. As a non-limiting example, one of the function block(s) 114A of DCN 110A can control an actuator of FT component 111A based on sensor data from sensor(s) of FT component 111A. As another non-limiting example, another of the function block(s) 114A of DCN 110A can control the actuator 113A in dependence on output(s) from other function block(s), such as other function block(s) implemented at DCN 110A and/or at other DCN(s) 110B-N.

The alarm engine 116A can optionally be implemented utilizing open standard protocol(s). For example, the alarm engine 116A can be implemented by an Open Platform Communications (OPC) Unified Architecture (OPC-UA) server that is executed on the DCN 110A by processor(s) 112A thereof. The alarm engine 116A can utilize alarm configuration file(s), described herein, in monitoring for occurrence of alarm condition(s) dictated by an alarm configuration file and performing corresponding action(s) if the alarm condition(s) are detected. The corresponding action(s) can also optionally be dictated by the alarm configuration file. The condition(s) defined by an alarm configuration file can include, or be restricted to, those that reference process variable(s) of function block(s), such as input variable(s), output variable(s), through variable(s), and/or internal variable(s) of function block(s).

The action(s) performed in response to an alarm condition being detected by alarm engine 116A can include, for example, sending corresponding data to alarm viewer 140 to cause rendering, at one or more output interface(s), of corresponding audible and/or visual alarm message(s). The sending of the corresponding data can be via a connection-oriented communication session that is established between the alarm engine 116A and the alarm viewer 140. The action(s) performed in response to an alarm condition being detected can additionally or alternatively include causing remediation(s) to be performed. For example, halting and/or altering function block(s) responsible for the alarm condition and/or related function block(s).

DCN 110B is coupled, via a first I/O, to a flow transmitter (FT) component 111B and, via a second I/O to a sensor 115B. DCN 110B includes processor(s) 112B that can utilize associated memory (and corresponding instructions stored therein) for implementing corresponding function(s) of the DCN 110B. Those function(s) include implementing function block(s) 114B of DCN 110B, which can be stored in some of the associated memory. Notably, DCN 110B does not include any corresponding alarm engine and, thus, the function(s) implemented by processor(s) 112B do not include implementing any alarm engine. Rather, alarm monitoring pertinent to function block(s) 114B, of DCN 110A, is performed by DCN 110C (described below).

Each of the function block(s) 114B of DCN 110B can define one or more aspects of sensor monitoring and/or actuator control that is performed by DCN 110B. In some implementations, each of the function block(s) 114B is a software model that contains input/output variable(s), through variable(s), internal variable(s), and/or an internal behavior description of the function(s) to be performed by the function block. As a non-limiting example, one of the function block(s) 114B of DCN 110B can control an actuator of FT component 111B based on sensor data from sensor(s) of FT component 111B, sensor data from sensor 115B, and/or sensor data from other sensor(s) (e.g., sensor of FT 111A).

DCN 110C is not coupled to any external component via any I/O and can optionally omit any I/O. Further, DCN 110C does not include any function blocks that it executes. Accordingly, DCN 110C does not implement any function blocks that directly or indirectly "control" any automated process of the process automation system 108. However, processor(s) 112C of DCN 110C do implement an alarm engine 116C that monitors function blocks of other DCN(s) of the process automation system. In some implementations, DCN 110C can be devoted exclusively to alarm monitoring.

Alarm engine 116C can optionally be implemented utilizing open standard protocol(s), such as by an OPC-UA server that is executed on the DCN 110C by processor(s) 112C thereof. The alarm engine 116C can utilize alarm configuration file(s), described herein, in monitoring for occurrence of alarm condition(s) dictated by an alarm configuration file and performing corresponding action(s) if the alarm condition(s) are detected. The condition(s) defined by an alarm configuration file can include, or be restricted to, those that reference process variable(s) of function block(s). The function block(s) to be monitored by alarm engine 116C include those that are not executed by DCN 110C (as DCN 110C does not execute any function blocks). For example, the alarm engine 116C can monitor function block(s) 114B of DCN 110B and/or function block(s) of other DCN(s). For instance, the monitoring of function block(s) 114B, during execution thereof, can be via communications, from DCN 110B, that reflect process variable(s) of the function block(s) 114B during their execution. Such communications can optionally be via a connection-oriented communication session between DCN 110B and DCN 110C via e.g., process automation network 106.

The action(s) performed in response to an alarm condition being detected by alarm engine 116C can include, for example, causing remediation(s) to be performed and/or sending, via a connection-oriented communication session, corresponding data to alarm viewer 140 to cause rendering, at one or more output interface(s), of corresponding audible and/or visual alarm message(s).

DCN 110N is coupled, via a first I/O, to a sensor 115N. DCN 110N includes processor(s) 112N that can utilize associated memory (and corresponding instructions stored therein) for implementing corresponding function(s) of the DCN 110N. Those function(s) include implementing function block(s) 114N of DCN 110N, which can be stored in some of the associated memory. Those function(s) also include implementing an alarm engine 116N. As described herein, the DCN 110N can obtain the alarm configuration file(s), that define the alarm(s) to be monitored by the alarm engine 116N, from the alarm configuration service 120 and via the process automation network 106.

The action(s) performed in response to an alarm condition being detected by alarm engine 116N can include, for example, causing remediation(s) to be performed and/or sending, via a connection-oriented communication session, corresponding data to alarm viewer 140 to cause rendering, at one or more output interface(s), of corresponding audible and/or visual alarm message(s).

The alarm configuration service 120 is illustrated as including a configuration module 122, a request and/or update module 124, and a push module 126. In some implementations, alarm configuration service 120 is implemented within a process automation facility, e.g., within a single building or across a single campus of buildings or other industrial infrastructure. In such an implementation, alarm configuration service 120 may be implemented on one or more local computing systems, such as on one or more server computers. However, in some implementations some or all aspects of alarm configuration service 120 can be implemented in computing system(s) that are remote from the process automation facility. In some of those implementations, the alarm configuration service 120 can be in communication with the process automation network 106 via a wide-area network.

The configuration module 122 can receive alarm configuration files, and assignments of those alarm configuration files to function block identifiers, and store those alarm configuration files and associated function block identifiers in alarms database 125. For example, a first alarm configuration file can be assigned to a first function block identifier of "FT101.PV", a second alarm configuration file can be assigned to a second function block identifier of "FT202.SP", etc. Further, the configuration module 122 can store, in the alarms database 125, the first alarm configuration file and an assignment (e.g., a pointer or other association) of the first alarm configuration file to the "FT101.PV" function block identifier, the second alarm configuration file and an assignment (e.g., a pointer or other association) of the first alarm configuration file to the "FT202.SP" function block identifier, etc.

The alarm configuration files and their associations can be generated based on user interface input(s) from engineer(s) and/or other human(s) implementing and/or maintaining the process automation system 108.

In some implementations, some or all of the alarm configuration files, and their associations, that are stored by the configuration module 122 are received from request and/or update module 124. As one example, when request and/or update module 124 transmits a default alarm configuration file in response to an alarm configuration request that includes a function block identifier, request and/or update module 124 can provide, to the configuration module 122, an indication of the function block identifier and the default alarm configuration file. In response, the configuration module 122 can store, in alarms database 125, the function block identifier, the default alarm configuration file, and the association between then function block identifier and the default alarm configuration file. As another example, when request and/or update module 124 receives an alarm configuration update that includes an updated default alarm configuration file and a corresponding function block identifier, request and/or update module 124 can provide, to the configuration module 122, an indication of the function block identifier and the updated default alarm configuration file. In response, the configuration module 122 can store, in alarms database 125, the function block identifier, the updated default alarm configuration file, and the association between then function block identifier and the default alarm configuration file.

In some implementations, some of the alarm configuration files and their associations are received via bulk configuration file(s) 135. The bulk configuration files 135 can be, for example, in .csv or other structured or unstructured format, and can be created utilizing one or more programs.

In some implementations, some of the alarm configuration files and their associations can be received via the non-local alarm configuration graphical user interface (GUI) 130. The alarm configuration GUI 130 can be implemented via configuration module 122 or can be implemented via a separate component that is at least selectively in communication with the configuration module 122. The alarm configuration GUI 130 can include graphical interface elements for specifying a function block identifier and for specifying alarm configuration file parameter(s) for the function block identifier. For example, the alarm configuration GUI 130 can include a field for specifying a function block identifier (e.g., from a drop-down menu, via free-form entry, via search or autocomplete based on entered character(s)) and can include field(s) for specifying function block variable(s) and condition(s) for those variable(s). For example, the alarm configuration GUI 130 can enable specification of a function block identifier and, once the function block identifier is specified, can present function block variable(s) for the corresponding function block. Further, each of the function block variable(s) can be selectable and, if selected, corresponding condition(s) for the function block variable(s) can be defined through further interaction with the alarm configuration GUI. The selected function block variable(s) and the condition(s) can then be used to generate a corresponding alarm configuration file, and the corresponding alarm configuration file associated with the function block identifier. Updates to alarm configuration file(s) can be performed via further bulk configuration file(s) and/or via further interaction with the alarm configuration GUI 130. For example, the alarm configuration GUI 130 can enable viewing of, and modification (or even deletion of) existing alarm configuration files in the alarms database 125 (optionally while maintaining their association to function block identifiers and, optionally, to DCN identifiers).

It is noted that, as described herein, interaction with alarm configuration GUI 130 can be used to define and/or update an alarm configuration file, and to define an association of an alarm configuration file with a function block identifier. Further, the alarm configuration file and the association can be stored in alarms database 125 and can be provided for implementation on a corresponding DCN in response to a corresponding alarm configuration request from the DCN or in response to being pushed to the DCN by push module 126. However, in various implementations and unlike HMI(s) described herein, the alarm configuration GUI 130 may not be directly communicatively coupled with any DCNs and/or may not directly interact with any DCNs (e.g., with an alarm engine thereof) in defining and/or updating an alarm configuration file.

Request and/or update module 124 receives and processes alarm configuration requests and/or alarm configuration updates from DCNs, such as one or more of DCNs 110A-N, that are received via the process automation network 106.

An alarm configuration request, received by request and/or update module 124, can include function block identifier(s) of function block(s) and, optionally, a DCN identifier of the DCN that transmitted the alarm configuration request. In response to receiving an alarm configuration request, the request and/or update module 124 can access alarms database 125 and determine whether, in the alarms database 125, there are any specific function block identifier(s) that match those of the alarm configuration request and that are stored in association with alarm configuration file(s). If so, the request and/or update module 124 can identify the alarm configuration file(s) that are stored in association with the matching function block identifier(s). Further, the request and/or update module 124 can transmit, via the process automation network and in response to the alarm configuration request and to the DCN that issued the alarm configuration request, the identified specific alarm configuration file(s). If the request and/or update module 124 determines there are not, in the alarms database 125, any specific function block identifier(s) that match those of the alarm configuration request and that are stored in association with alarm configuration file(s), it can determine default alarm configuration file(s) based on the function block identifier(s). For example, the default alarm configuration file(s) can be stored in the alarms database 125 and/or generated based on data from the alarms database 125. Further, the request and/or update module 124 can transmit, via the process automation network and in response to the alarm configuration request and to the DCN that issued the alarm configuration request, the default alarm configuration file(s).

In some implementations, the request and/or update module 124 can also cause the configuration module 122 to update the alarms database 125 to store an association of a DCN identifier, optionally included with the alarm configuration request, with the identified function block identifier(s) and/or to the identified alarm configuration file(s). In doing so, the configuration module 122 can optionally remove any stored association(s) of a disparate DCN identifier to the identified function block identifier(s) and/or the identified alarm configuration file(s).

An alarm configuration update, received by request and/or update module 124, can include function block identifier(s) and corresponding alarm configuration file(s) that are based on previously provided default alarm configuration file(s). For example, an alarm configuration file received in an alarm configuration update can be an updated default alarm configuration file that is based on a default alarm configuration previously provided to a DCN, but that includes new value(s) that are based on modification(s) made via interaction of an HMI with the DCN. In response to receiving the alarm configuration update, the request and/or update module 124 can provide related data to configuration module 122 to cause configuration module 122 to store, in alarms database 125, the function block identifier(s) and the alarm configuration file(s) of the alarm configuration update, and an association of the function block identifier(s) to the alarm configuration file(s). In some implementations, the request and/or update module 124 can also cause the configuration module 122 to store an association of a DCN identifier, optionally included with the alarm configuration update, to the received function block identifier(s) and/or to the received alarm configuration file(s).

Push module 126 is optional and, when provided can be used to cause updated alarm configuration file(s) to be provided to corresponding DCN(s) that are utilizing pre-updated version(s) of the alarm configuration file(s). For example, in response to an update of an alarm configuration file via alarm configuration GUI 130, configuration module 122 can store, in alarms database 125, the updated alarm configuration file in association with its function block identifier, while maintaining any association of the function block identifier to a DCN identifier and/or while creating an association of the updated alarm configuration file to a DCN identifier. As described with respect to request and/or update module 124, the request and/or update module 124 can optionally cause the configuration module 122 to store, in alarms database 125 association(s) of a DCN identifier to function block identifier(s) and/or alarm configuration file(s) in response to an alarm configuration request or an alarm configuration update, from a corresponding DCN, that includes the function block identifier(s). The push module 126 can identify an updated alarm configuration file in response to a notification from configuration module 122 or in response to recognizing an update in the alarms database 125. In response to identifying an updated alarm configuration file, the push module 126 can cause the updated alarm configuration file to be provided to the DCN that corresponds to the DCN identifier associated with the updated alarm configuration file and/or its associated function block identifiers.

In some implementations, in causing an updated alarm configuration file to be provided to the DCN that corresponds to the DCN identifier, the push module 126 can transmit the updated alarm configuration file to the DCN identifier and independent of any alarm configuration request from the DCN. For example, the DCN identifier can be an IP address and the push module 126 can transmit the updated alarm configuration file to the IP address. In some implementations, in causing an updated alarm configuration file to be provided to the DCN that corresponds to the DCN identifier, the push module 126 can transmit, to the DCN identifier, an update request that when received by the DCN, can be determined to be an alarm configuration condition. The DCN can thereafter, when deemed appropriate by the DCN, transmit an alarm configuration request. The alarm configuration request can be processed by the request and/or update module 124, and the updated alarm configuration file transmitted, by the request and/or update module 124 to the DCN, in response to the alarm configuration request.

In some implementations, alarm viewer 140 is implemented within a process automation facility. In such an implementation, alarm viewer 140 may be implemented on one or more local computing systems, such as on one or more server computers. However, in some implementations some or all aspects of alarm viewer 140 can be implemented in computing system(s) that are remote from the process automation facility. In some of those implementations, the viewer 140 can be in communication with the process automation network 106 via a wide-area network. Alarm viewer 140 can be in communication with alarm engine(s) of DCN(s) 110A-N via connection-oriented communication sessions.

Alarm viewer 140 can cause rendering, of at least any active alarm(s), via one or more output device(s), in response to and in accordance with alarm message(s) received via an alarm engine via a respective connection-oriented communication session. For example, the alarm viewer 140 can cause display of at least active alarm(s) via fixed display screen(s) in a process automation facility. The fixed display screen(s) can be communicatively coupled with the computing system(s) that implement the alarm viewer. Also, for example, the alarm viewer 140 can cause at least some active alarm(s) (e.g., those designated as "high severity" in corresponding alarm configuration file(s)) to be transmitted to mobile phone(s) of individual(s) e.g., as text message alerts or push notification(s) through an alarm application installed on the mobile phone(s). Such transmitting can be via the process automation network 106 and/or via one or more WANs connected to the process automation network. The rendering of an active alarm by alarm viewer 140 can optionally include audible and/or visual rendering of a descriptor or other message(s) that corresponds to the condition(s) that caused the alarm, such as a descriptor defined in the alarm configuration file for the alarm.

An active alarm can be signaled to the alarm viewer 140 based on a transmission from a DCN whose alarm engine determined occurrence of the active alarm. The transmission can include a message pertaining to the alarm e.g., a descriptor of the alarm as determined using an alarm configuration file, an identification of the function block and/or process variable(s) that resulted in the alarm, and/or an indication of the alarm configuration file. The alarm viewer 140, in rendering detail(s) on the alarm, can utilize information included in the transmission from the DCN and/or information that is derived, from the alarms database 125, utilizing information included in the transmission.

FIG. 1 illustrates the example environment 100 at a first point in time, such as during or right after initial commissioning of the process automation system 108. In some implementations, during initial commissioning, one or more of the DCNs 110A-N can initially include locally stored function block(s) (and corresponding function block identifier(s)) and/or locally stored alarm engine(s) (and corresponding function block identifier(s)), but may not have any alarm configuration file(s) stored thereon. After connecting to process automation network 106, such one or more of the DCNs 110A-N can each transmit a corresponding alarm configuration request and, in response, obtain any responsive specific alarm configuration file(s) and/or responsive default alarm configuration files from alarm configuration service 120.

For example, in FIG. 1 DCN 110A transmits, to request and/or update module 124, an alarm configuration request 117A that includes function block identifier(s) of function block(s) 114A that are monitored by alarm engine 116A. The request and/or update module 124 can access the alarms database 125 and determine that no specific alarm configuration files are stored in association with the function block identifier(s) of the request 117A. A specific alarm configuration file is a non-default alarm configuration file. A specific alarm configuration file can be stored in the alarms database 125 in association with a function block identifier based on, for example, the association being defined in bulk configuration file(s) 135, the association being defined via alarm configuration GUI 130, or the association being defined via a prior alarm configuration update.

In response to determining that no specific alarm configuration files are stored in association with the function block identifier(s) of the request 117A, the request and/or update module 124 can determine, based on function block type(s) indicated by the function block identifier(s), default alarm configuration file(s) 119A that correspond to the function block type(s). Further, the request and/or update module 124 can transmit the default alarm configuration file(s) 119A to the DCN 110A to cause them to be locally stored by the DCN 110A. As a particular example, a function block identifier of the request 117A can end in ".PV", indicating it is of a process variable type. Default alarm configuration file(s) 119A for that type can include, for example, "error", "level", "rate of change", and "deviation" default alarm configuration files.

Also, for example, in FIG. 1 DCN 110C transmits, to request and/or update module 124, an alarm configuration request 117C that includes function block identifier(s) of function block(s) that are monitored by alarm engine 116C, such as function block(s) 114B of DCN 110B as described above. The request and/or update module 124 can access the alarms database 125 and determine that specific alarm configuration file(s) 119C are stored in association with the function block identifier(s) of the request 117C. For example, the specific alarm configuration files stored in association with the function block identifier(s) can be ones defined via bulk configuration file(s) 135. In response to determining that specific alarm configuration file(s) 119C are stored in association with the function block identifier(s) of the request 117C, the request and/or update module 124 can transmit the specific alarm configuration file(s) 119C to the DCN 110C to cause them to be locally stored by the DCN 110C and to cause alarm engine 116C to implement local alarm monitoring based on the specific alarm configuration file(s) 119C. Accordingly, specific alarm configuration file(s) 119C are transmitted to DCN 110C, in lieu of default alarm configuration file(s), in response to the specific alarm configuration file(s) 119C being stored, in alarms database 125, in association with the function block identifier(s) of the request 117C.

Also, for example, in FIG. 1 DCN 110N transmits, to request and/or update module 124, an alarm configuration request 117N that includes function block identifier(s) of function block(s) 114N that are monitored by alarm engine 116N. The request and/or update module 124 can access the alarms database 125 and determine that no specific alarm configuration files are stored in association with the function block identifier(s) of the request 117N.

In response to determining that no specific alarm configuration files are stored in association with the function block identifier(s) of the request 117N, the request and/or update module 124 can determine, based on function block type(s) indicated by the function block identifier(s), default alarm configuration file(s) 119N that correspond to the function block type(s). Further, the request and/or update module 124 can transmit the default alarm configuration file(s) 119N to the DCN 110N to cause them to be locally stored by the DCN 110A. As a particular example, a function block identifier of the request 117A can end in ".AI", indicating it is of an analog input type. Default alarm configuration file(s) 119N for that type can include, for example, "error" and "discrete state" default alarm configuration files.

Figure 2:
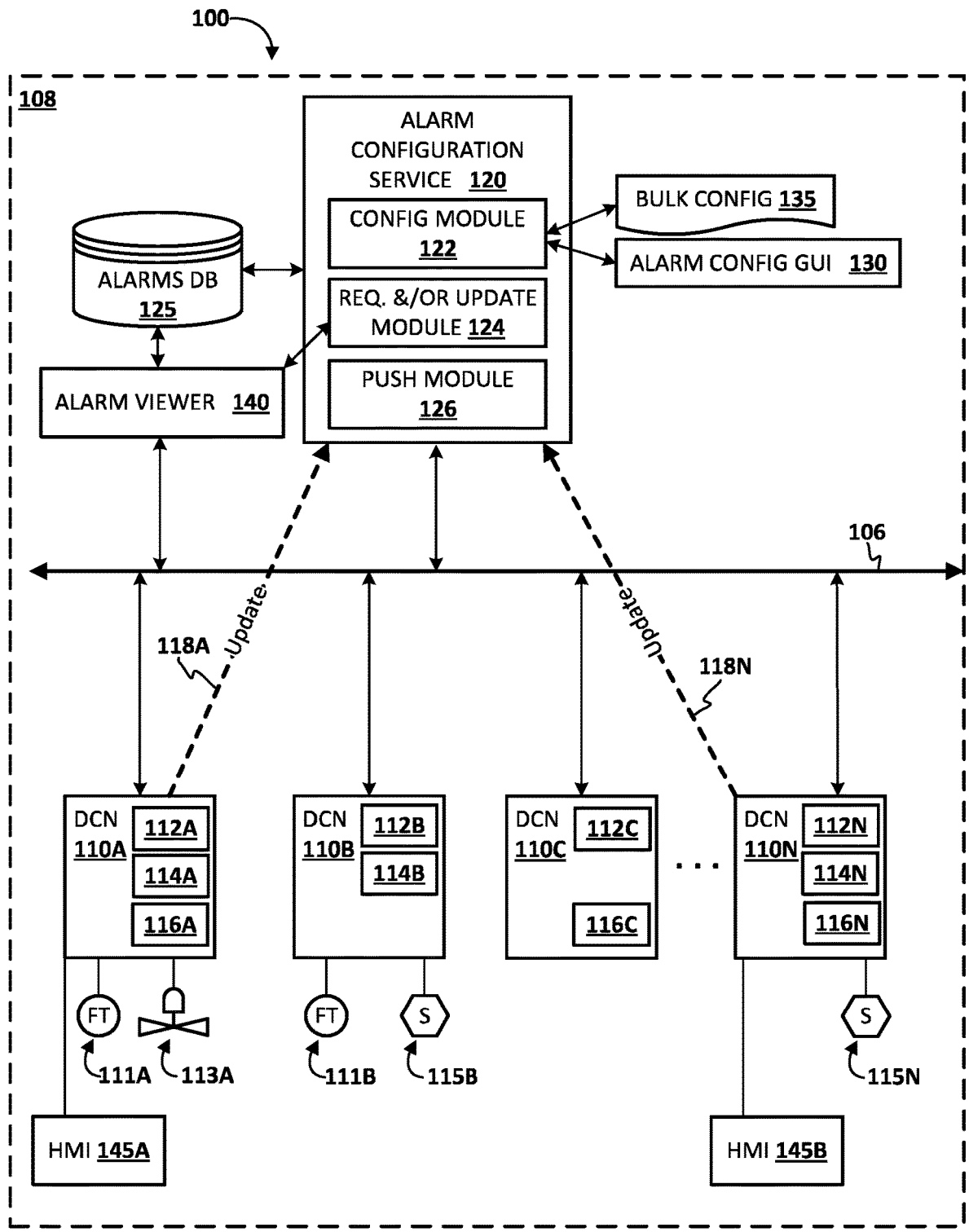
FIG. 2 illustrates the example environment of FIG. 1, after HMI(s) have been used to update, at DCNs, default alarm configuration files previously received at some of the DCNs.

Turning now to FIG. 2, the example environment 100 is illustrated subsequent to the alarm configuration requests 117A-C of FIG. 1 being provided and default alarm configuration file(s) 119A and 119N being provided to respective of DCNs 110A and 110N. Further, the example environment 100 is illustrated after HMI 145A has been utilized to update the default alarm configuration file(s) 119A at DCN 110A and HMI 145B has been utilized to update the default alarm configuration file(s) 119N at DCN 110N.

As one example, the default alarm configuration file(s) 119A transmitted to DCN 110A can include one that is a level alarm for a measured flow variable (based on a sensor of the FT component 111A) of the function block(s) 114A, but can lack any specified values for high-high, high, low, and/or low-low limit(s). The HMI 145A can, when coupled with the DCN 110A (e.g., via wired connection or wireless connection), provide a GUI that can be used to define specified values for the high-high, high, low, and/or low-low limit(s), thereby creating an updated default alarm configuration file. As another example, the default alarm configuration file(s) 119A can include one that is a rate of change alarm for the measured flow variable, but can lack a specified value for a maximum rate of change of the measured flow variable. The HMI 145A can, when coupled with the DCN 110A (e.g., via wired connection or wireless connection), be used to define a value for the maximum rate of change, thereby creating an additional updated default alarm configuration file.

In response to the update at DCN 110A, and as illustrated in FIG. 2, DCN 110A transmits, to alarm configuration service 120, an alarm configuration update 118A that includes the updated default alarm configuration file(s) and corresponding function block identifier(s). In response to receiving the alarm configuration update 118A, the alarm configuration service 120 stores, in alarms database 125, the updated default alarm configuration file(s) and an association of the file(s) with the corresponding function block identifier(s).

In response to the update at DCN 110N, and as illustrated in FIG. 2, DCN 110N transmits, to alarm configuration service 120, an alarm configuration update 118N that includes the updated default alarm configuration file(s) and corresponding function block identifier(s). In response to receiving the alarm configuration update 118N, the alarm configuration service 120 stores, in alarms database 125, the updated default alarm configuration file(s) and an association of the file(s) with the corresponding function block identifier(s).

Figure 3:
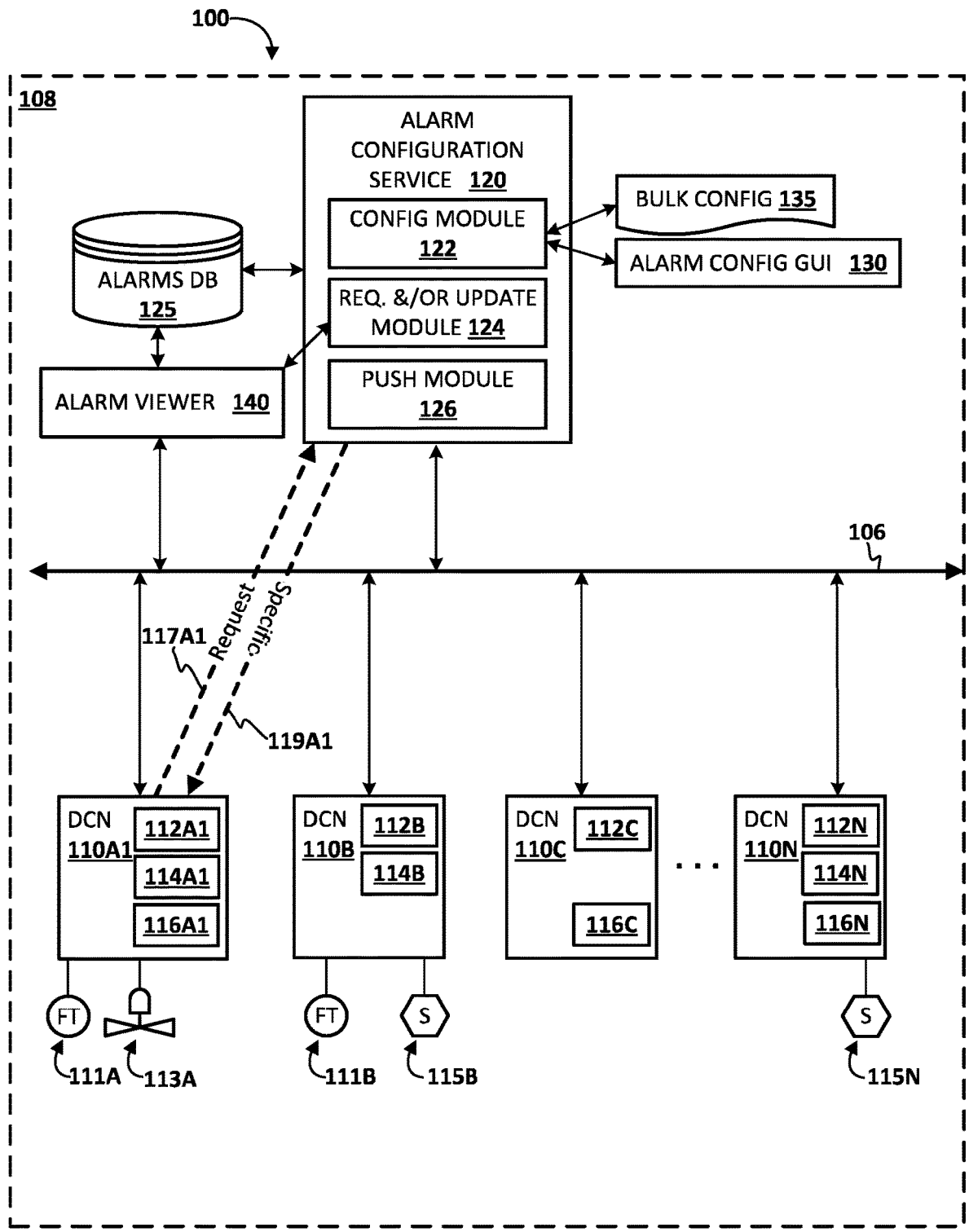
FIG. 3 illustrates the example environment of FIGS. 1 and 2, at a time after FIG. 2 and after a DCN of FIGS. 1 and 2 has been replaced with an alternate DCN.

Turning now to FIG. 3, the example environment 100 is illustrated at a time after the time of FIG. 2 and after DCN 110A of FIGS. 1 and 2 has been replaced with an alternate DCN 110A1. The alternate DCN 110A1 can replace DNC 110A due to, for example, failure of DCN 110A. In FIG. 3, DCN 110A1 is coupled, via a first I/O, to the FT component 111A and is coupled, via a second I/O to the actuator 113A. DCN 110A1 includes processor(s) 112A1 that can utilize associated memory (and corresponding instructions stored therein) for implementing corresponding function(s) of the DCN 110A1. Those function(s) include implementing function block(s) 114A1 of DCN 110A1, which can be stored in some of the associated memory and can be the same as function blocks 114A of DCN 110A. Those function(s) also include implementing an alarm engine 116A1. In response to commissioning or being powered on, the DCN 110A1 can transmit an alarm configuration request 117A1 that includes function block identifiers of the function block(s) 114A1 and/or of the function block(s) that are monitored by the alarm engine 116A1, which can be the same as those of DCN 110A (FIG. 1).

The request and/or update module 124 can, in response to the alarm configuration request 117A1, identify, from alarms database 125, the updated alarm configuration file(s) that were included in the alarm configuration update 118A (FIG. 2). Those updated alarm configuration file(s) can be identified based on them being stored, in the alarms database 125, in association with the function block identifier(s) of the alarm configuration request 117A1 and, based on being stored in association with those function block identifier(s) can be considered specific alarm configuration file(s) 119A1. Further, the request and/or update module 124 can transmit, to the DCN 110A1, the specific alarm configuration file(s) 119A1, to cause implementation of the specific alarm configuration file(s) 119A1 by the alarm engine 116A1 of the DCN 110A1.

Yet further, the request and/or update module 124 can optionally update the alarms database 125 to store an association of a DCN identifier, of DCN 110A1, with the specific alarm configuration file(s) 119A1 and/or with the function block identifier(s) and/or can provide, to the alarm viewer 140, the DCN identifier of DCN 110A1. It is noted that the DCN identifier of DCN 110A1 can be unique relative to the DCN identifier of replaced DCN 110A. Updating the alarms database 125 to reflect the DCN identifier of DCN 110A1 and/or providing the push notification to the alarm viewer 140 can enable alarm viewer 140 to establish a connection-oriented communication session with DCN 110A1 and/or can enable effective pushing, of updated alarm configuration file(s), by push module 126. Further, the unique DCN identifier of DCN 110A1 illustrates the robustness of including the function block identifier in the alarm configuration request, and the use thereof by request and/or update module 124 in responding to the alarm configuration request 117A1. For example, if some of the responsive specific alarm configuration files 119A1 had instead been stored only in association with a DCN identifier of DCN 110A, and the DCN identifier of DCN 110A1 included in the request in lieu of the function block identifier(s), the request and/or update module 124 would be unable to identify such alarm configuration file(s) in response to the alarm configuration request from DCN 110A1.

Figure 4:
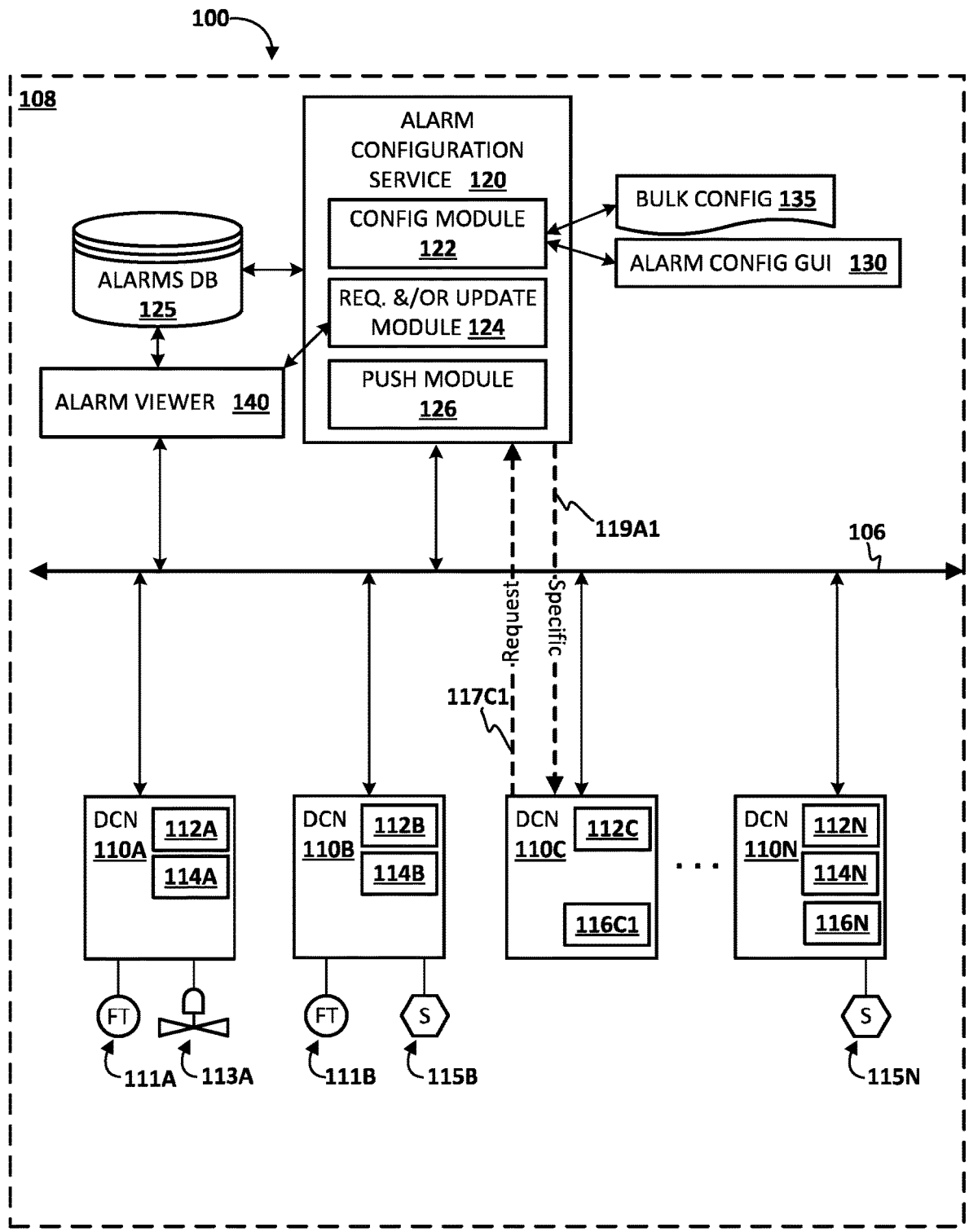
FIG. 4 illustrates the example environment of FIGS. 1 and 2, at a time after FIG. 2 and after a DCN of FIGS. 1 and 2 has been altered to remove alarm monitoring functionality and the alarm monitoring functionality, removed from the DCN, is implemented on a separate DCN.

FIG. 4 illustrates the example environment of FIGS. 1 and 2, at a time after FIG. 2 and after DCN 110A of FIGS. 1 and 2 has been altered to remove the alarm engine 116A and the alarm monitoring functionality, previously performed by the alarm engine 116A, is now assigned for monitoring by modified alarm engine 116C1 of DCN 110C. In response to detecting an alarm configuration condition, DCN 110C can transmit an alarm configuration request 117C1 that includes function block identifier(s) of at least the function block(s) that were previously monitored by the alarm engine 116A.

The request and/or update module 124 can, in response to the alarm configuration request 117C1, identify, from alarms database 125, the updated alarm configuration file(s) that were included in the alarm configuration update 118A (FIG. 2). Those updated alarm configuration file(s) can be identified based on them being stored in association with the function block identifier(s) of the alarm configuration request 117C1 and, based on being stored, in alarms database 125, in association with those function block identifier(s) are considered specific alarm configuration file(s) 119A1. Further, the request and/or update module 124 can transmit, to the DCN 110C, the specific alarm configuration file(s) 119A1, to cause implementation of the specific alarm configuration file(s) 119A1 by the alarm engine 116C1 of the DCN 110C. Yet further, the request and/or update module 124 can optionally update the alarms database 125 to store an association of a DCN identifier, of DCN 110C, with the specific alarm configuration file(s) 119A1 and/or with the function block identifier(s).

Figure 5:
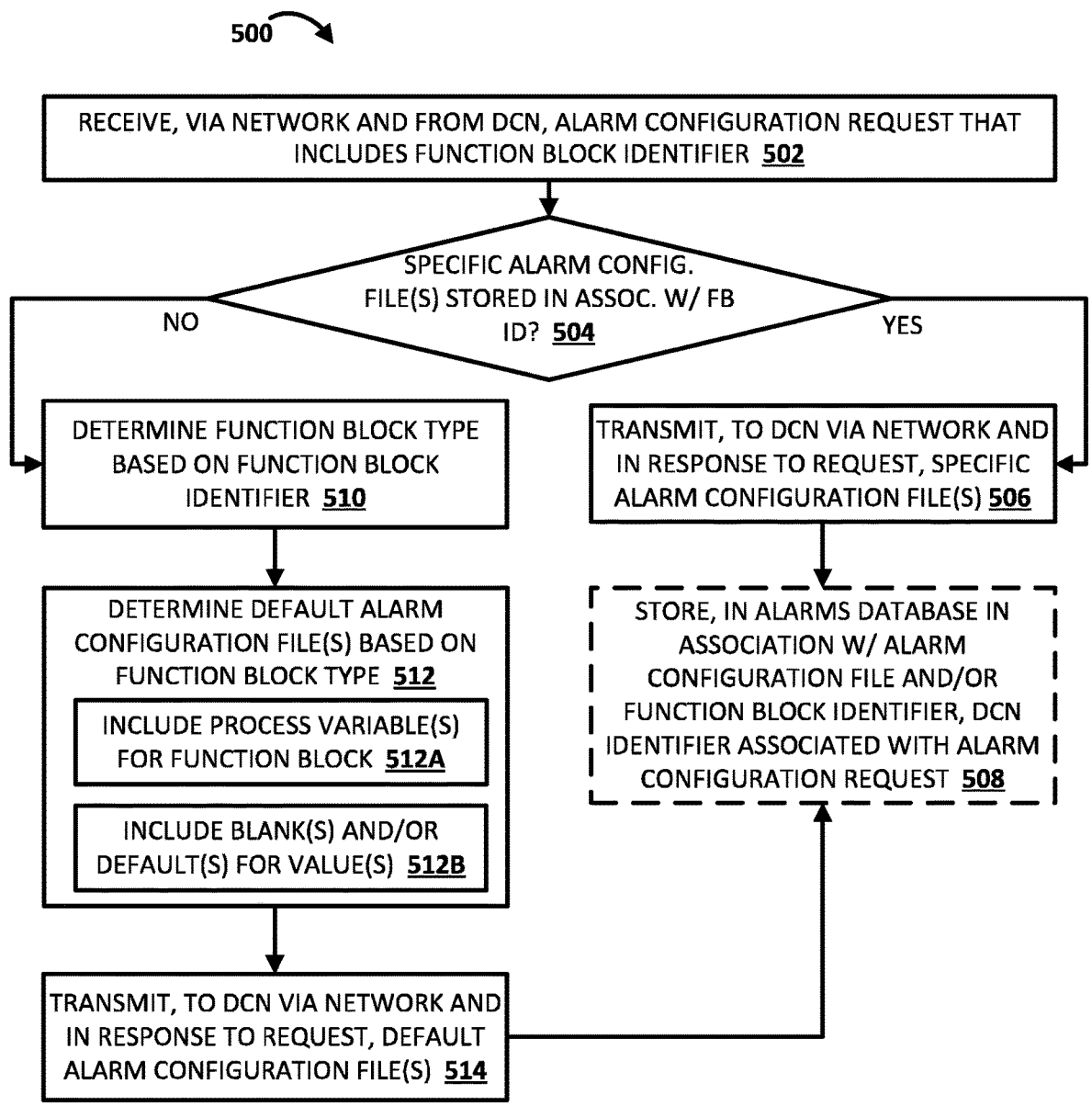
FIG. 5 illustrates an example method of processing an alarm configuration request from a DCN, including at least selectively responding to the alarm configuration request by transmitting, to the DCN, default alarm configuration file(s) that are determined based on a function block type of a function block indicated by the alarm configuration request.

FIG. 5 is a flowchart illustrating an example method 500 of processing an alarm configuration request from a DCN, including at least selectively responding to the alarm configuration request by transmitting, to the DCN, default alarm configuration file(s) that are determined based on a function block type of a function block indicated by the alarm configuration request. For convenience, the operations of the flow chart are described with reference to a system that performs the operations. This system may include various components of various computer systems, such as alarm configuration service 120 (e.g., request and/or update module 124). Moreover, while operations of method 500 are shown in a particular order, this is not meant to be limiting. One or more operations may be reordered, omitted or added.

At block 502, the system receives, via a process automation network and from a DCN, an alarm configuration request that includes a function block identifier. For example, the alarm configuration request can be one transmitted by the DCN based on the DCN performing block 704 of method 700 of FIG. 7.

At block 504, the system determines whether there are any specific alarm configuration files that are stored in association with the function block identifier (of the alarm configuration request of block 502) in an alarms database. For example, the system can search the alarms database, using the function block identifier, to determine whether there are any stored associations of the function block identifier with specific alarm configuration file(s). As described herein, a specific alarm configuration file is a non-default alarm configuration file, such as an updated (based on HMI input(s)) default alarm configuration file or one defined via bulk upload and/or a non-local alarm configuration GUI.

If the determination at block 504 is yes, the system proceeds to block 506 and transmits, to the DCN, the specific alarm configuration file(s). The system transmits the specific alarm configuration file(s) via the process automation network and in response to the request of block 502. The system can then optionally proceed to optional block 508, in which the system stores, in the alarm database and in association with the transmitted alarm configuration file(s) and/or in association with the function block identifier, a DCN identifier associated with the alarm configuration request. For example, the DCN identifier can be an addressable DCN identifier (e.g., IP address) that is included in a header or body of the alarm configuration request.

If the determination at block 504, is no, the system proceeds to block 510 and determines a function block type based on the function block identifier of the alarm configuration request of block 502. For example, the system can determine the function block type based on character(s) of the function block identifier being mapped to the function block type, such as suffix characters that follow "." in the function block identifier.

At block 512, the system determines default alarm configuration file(s) based on the function block type determined at block 510. In some implementations, block 510 includes sub-block 512A and/or sub-block 512B.

At sub-block 512A, if the system has access to the function block corresponding to the function block identifier, the system optionally includes process variable(s), from the function block, in the default alarm configuration file(s). The system can have access to the function block based on it being included in the alarm configuration request of block 502 or based on it being stored in association with the function block identifier in an alarms database. As an example, of sub-block 512A, assume a default alarm configuration file for a "deviation" alarm type and that the function block includes a process variable of "tank123temp". At sub-block 512A the system can include "tank123temp" as a process variable, of the default alarm configuration file, that is to be compared to a deviation value in determining whether a deviation condition has occurred. This can obviate the need for future specification of the process variable via an HMI coupled to the DCN.

At sub-block 512B, the system includes, for value(s) for parameter(s) of the alarm configuration file, blank(s) and/or default value(s). As an example, of sub-block 512A, assume a default alarm configuration file for a "rate of change" alarm type in which an amount of change value and a specified time value are needed to determine whether a rate of change condition is satisfied. In some implementations, the system can include a blank or a null value for both the amount of change value and the specified time value. In some implementations, the system can include a default value for one or both of the amount of change value and the specified time value. For example, the system can identify, based on the alarm type (deviation) and/or the function block type, a default amount of change value and a default specified time value, and incorporate both in the alarm configuration file. For instance, a first default amount of change value can be defined for the deviation alarm type and an "analog input" function block type and a second default amount of change value can be defined for the deviation alarm type and a "ratio" function block type. As another example, of sub-block 512A, assume a default alarm configuration file that includes an alarm severity parameter. In some implementations, the system can include a blank or a null value for the severity parameter. In some implementations, the system can include a default value for the severity parameter, such as one that is a default for the alarm type and/or the function block type.

At block 514, the system transmits, to the DCN, the default alarm configuration file(s) determined at block 512. The system transmits the default alarm configuration file(s) via the process automation network and in response to the request of block 502. The system can then optionally proceed to optional block 508, in which the system stores, in the alarm database and in association with the transmitted alarm configuration file(s) and/or in association with the function block identifier, a DCN identifier associated with the alarm configuration request. For example, the DCN identifier can be an addressable DCN identifier (e.g., IP address) that is included in a header or body of the alarm configuration request.

Figure 6:
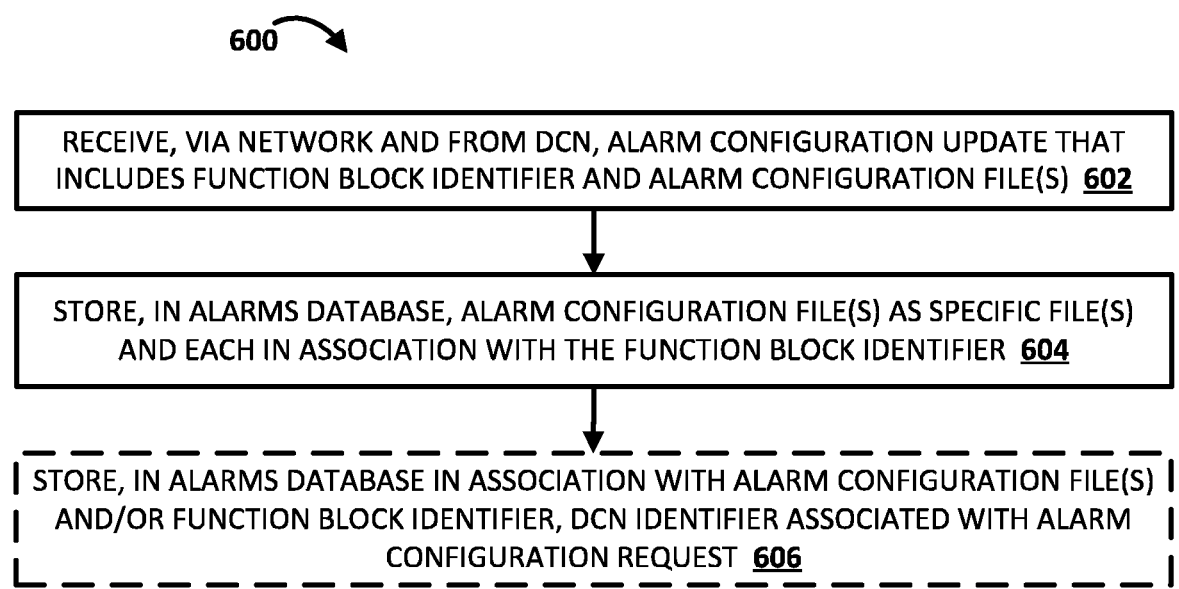
FIG. 6 illustrate an example method of processing an alarm configuration update from a DCN.

FIG. 6 is a flow chart illustrating an example method 600 of processing an alarm configuration update from a DCN. For convenience, the operations of the flow chart are described with reference to a system that performs the operations. This system may include various components of various computer systems, such as alarm configuration service 120 (e.g., request and/or update module 124). Moreover, while operations of method 600 are shown in a particular order, this is not meant to be limiting. One or more operations may be reordered, omitted or added.

At block 602, the system receives, via a process automation network and from a DCN, an alarm configuration update that includes a function block identifier and alarm configuration file(s). For example, the alarm configuration update can be one transmitted by the DCN based on the DCN performing block 722 of method 700 of FIG. 7. The alarm configuration file(s) of the alarm configuration update can include alarm configuration file(s) that are updated version(s) of default alarm configuration file(s) previously transmitted to the DCN (e.g., at block 514 of method 500 of FIG. 5). For example, an included alarm configuration file can be the same as a previously transmitted default alarm configuration file, but can include various additional or alternative value(s) that have been defined via interaction(s) with an HMI communicatively coupled to the DCN.

At block 604, the system stores the alarm configuration file(s) of the alarm configuration update in an alarms database and as specific files. The system also stores, in the alarms database, each of the alarm configuration file(s) of the alarm configuration update in association with the function block identifier of the alarm configuration update.

Figure 7:
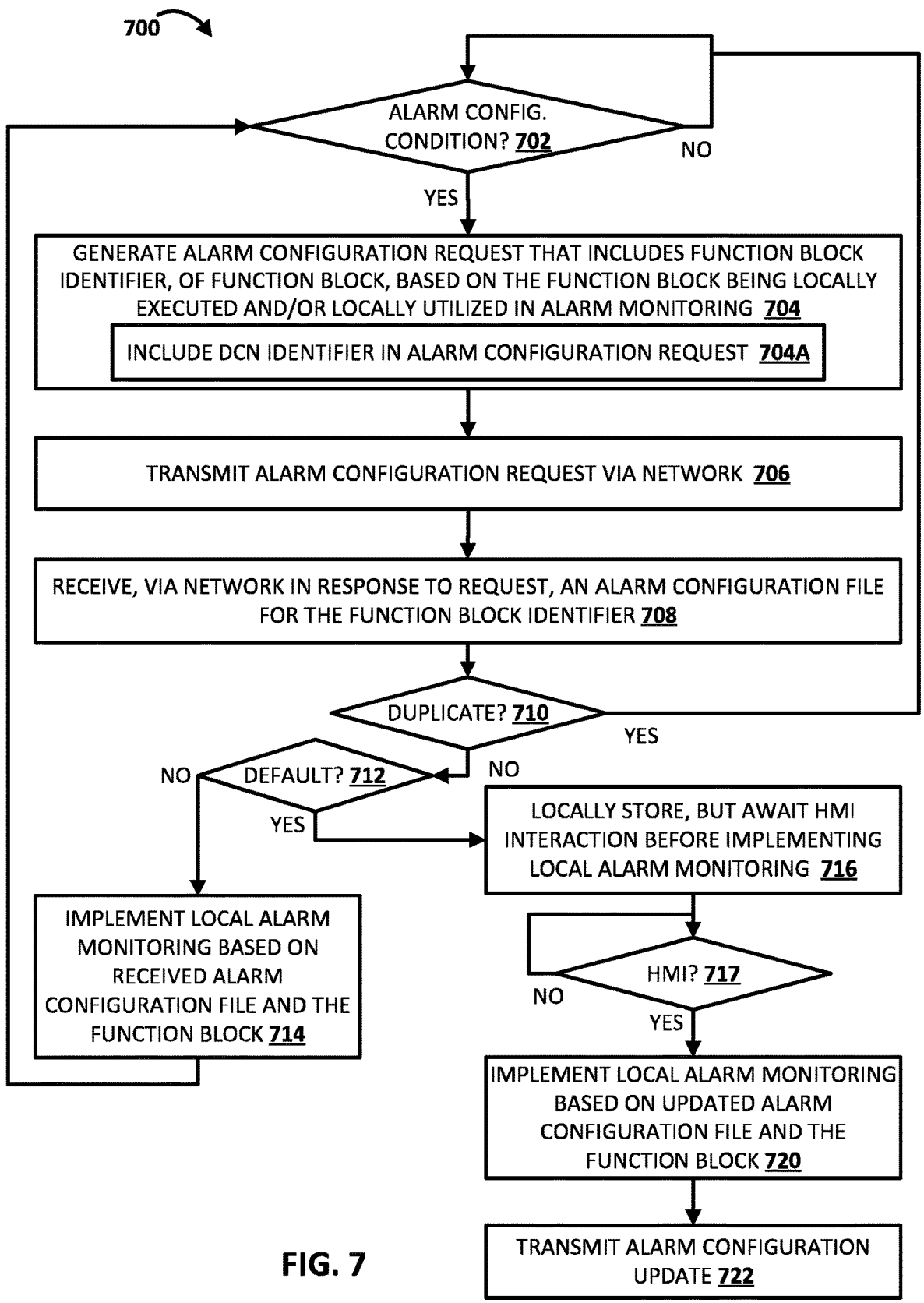
FIG. 7 illustrates an example method of generating and transmitting an alarm configuration request, receiving an alarm configuration file in response, and implementing local alarm monitoring based on the received alarm configuration file.

FIG. 7 is a flowchart illustrating an example method 700 of generating and transmitting an alarm configuration request, receiving an alarm configuration file in response, and implementing local alarm monitoring based on the received alarm configuration file. For convenience, the operations of the flow chart are described with reference to a system that performs the operations. This system may include various components of various computer systems, such as any one of DCNs 110A-N. Moreover, while operations of method 700 are shown in a particular order, this is not meant to be limiting. One or more operations may be reordered, omitted or added.

At block 702, the system monitors for occurrence of an alarm configuration condition. If an alarm configuration condition is detected at block 702, the system proceeds to block 704. In some implementations, at block 702 the system monitors for occurrence of any one of multiple conditions, such as determining it is newly commissioned, determining it has been powered up, determining that its alarm engine is assigned to monitor function block(s) but that monitoring not being currently active, determining that is has been more than a threshold duration of time since it last issued an alarm configuration request, and/or receiving an update request from an alarm configuration service (e.g., from push module 126).

At block 704, the system generates an alarm configuration request that includes a function block identifier, of a function block, based on the function block being locally executed and/or being locally utilized in alarm monitoring. For example, the system can include the function block identifier based on it being assigned for use by an alarm engine, of the system, in alarm monitoring. In some implementations, the alarm configuration request includes multiple function block identifiers, of multiple function blocks, based on them each being locally executed and/or being locally utilized in alarm monitoring. In some implementations, block 704 includes sub-block 704A in which the system also includes, in the alarm configuration request, a DCN identifier of the DCN that generates and transmits the alarm configuration request.

At block 706, the system transmits the alarm configuration request, generated at block 804, via a process automation network.

At block 708, the system receives, via the process automation network and in response to the request, an alarm configuration file for the function block identifier. At block 708, the system can optionally receive multiple alarm configuration files when, for example, the alarm configuration request includes multiple function block identifiers. In some implementations, the alarm configuration file(s) are received, at block 708, responsive to block 506 or block 510, of method 500 of FIG. 5, being performed.

At block 710, the system determines whether all of the received alarm configuration files are duplicates. That is, whether all of the received alarm configuration files are already locally stored and being locally utilized by the alarm engine of the system in performing alarm monitoring. If so, the system proceeds back to block 702 and monitors for occurrence of another alarm configuration condition. If not, the system proceeds to block 712.

At block 712, the system determines, for each received alarm configuration file, whether it is a default alarm configuration file or, instead, is a specific alarm configuration file. If the system determines an alarm configuration file is a specific alarm configuration file, the system proceeds to block 714 and implements local alarm monitoring based on the received alarm configuration file and the function block. In implementing local alarm monitoring based on an alarm configuration file and a function block, the system can monitor the function block (e.g., during execution of the function block) for satisfaction of condition(s) of the alarm configuration file and, in response to detecting satisfaction of the condition(s), perform corresponding action(s) for the satisfied condition(s).

If the system determines, at block 712, that an alarm configuration file is a default alarm configuration file, the system proceeds to block 716. At block 716, the system locally stores the default alarm configuration file, but does not immediately implement alarm monitoring based on the default alarm configuration file. Rather, the system awaits HMI interaction that updates the default alarm configuration file, and optionally confirms the updated default alarm configuration file, before implementing alarm monitoring based on the updated alarm configuration file.

At block 717 the system awaits the HMI interaction that updates the default alarm configuration file, and optionally confirms the updated default alarm configuration file. For example, the system awaits user input(s), provided via the HMI while communicatively coupled with the system, that specify one or more unspecified values of the default alarm configuration file and/or that alter one or more default values of the default alarm configuration file.

When, at block 717, HMI interaction occurs that updates the default alarm configuration file, and optionally confirms the updated default alarm configuration file, the system proceeds to block 720. At block 720, the system implements local alarm monitoring based on the updated alarm configuration file and the function block.

The system also proceeds to block 722, and transmits an alarm configuration update that includes the updated alarm configuration file and the function block.

Block 810 can optionally include sub-block 810A. At sub-block 810A, in implementing local alarm monitoring based on the receive alarm configuration file and the function block, the system monitors the function block (e.g., during execution of the function block) for satisfaction of condition(s) of the alarm configuration file and, in response to detecting satisfaction of the condition(s), perform(s) corresponding action(s) for the satisfied condition(s), such as transmitting corresponding data to an alarm viewer.

Figure 8:
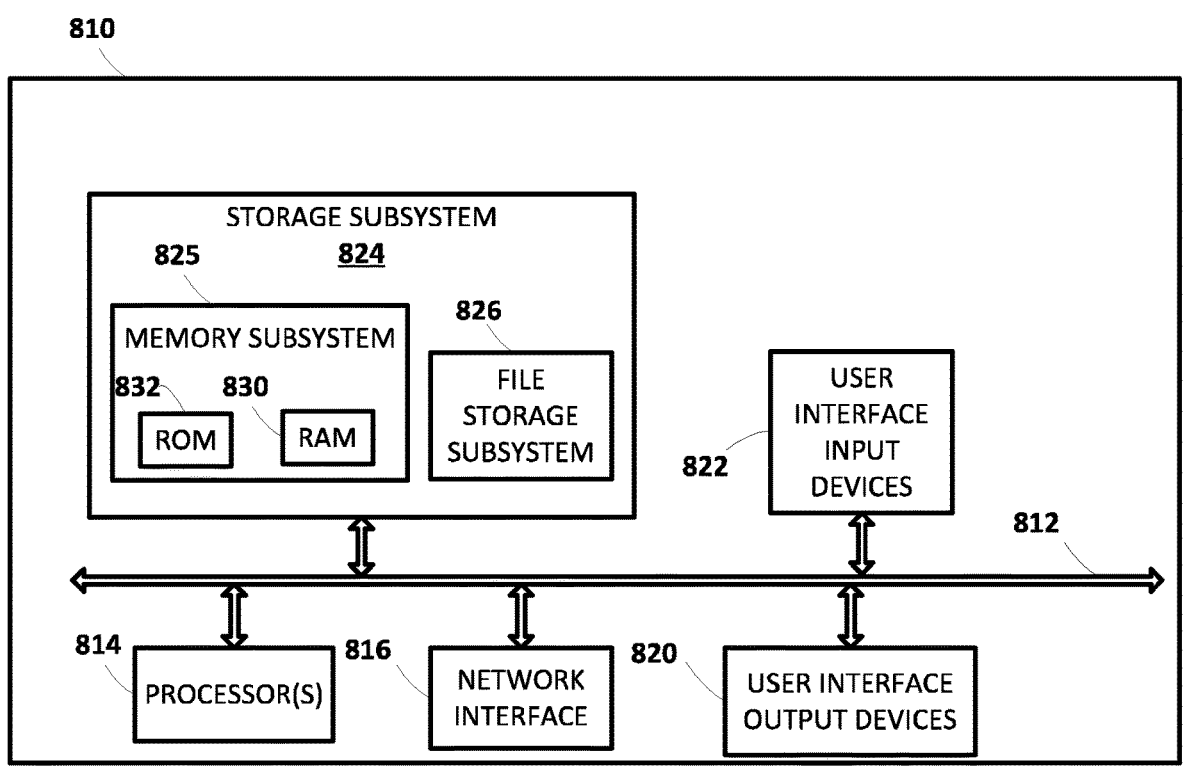
FIG. 8 schematically illustrates an example computer architecture on which selected aspects of the present disclosure can be implemented.

FIG. 8 is a block diagram of an example computing device 810 that may optionally be utilized to perform one or more aspects of techniques described herein. For example, computing device 810 is an example of a computing device that can implement all or parts of alarm configuration service and/or, optionally, all or parts of some DCN(s). Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods of FIGS. 5-7, as well as to implement various components depicted in FIGS. 1-4.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by hardware processor(s) is provided and includes determining that a distributed control node (DCN), of a process automation system, is executing a function block of a particular type. The method further includes determining a default alarm configuration file based on the particular type. The method further includes, responsive to determining that the DCN is executing the function block of the particular type, transmitting, via a network of the process automation system and to the DCN, the default alarm configuration file determined based on the particular type. The default alarm configuration file is locally editable via the DCN and, when edited, is used by the DCN in implementing alarm monitoring based on the function block.

These and other implementations of the technology disclosed herein can include one or more of the following features.

In some implementations, the method further includes subsequent to transmitting, to the DCN, the default alarm configuration file for the particular type: receiving, via the network and from the DCN, an alarm configuration update that includes: a function block identifier of the function block executed by the DCN, and an updated alarm configuration file that is an edited version of the previously transmitted default alarm configuration file; and storing, in an alarms database, the updated alarm configuration file and an association of the updated alarm configuration file with the function block identifier. In some versions of those implementations, the method further includes, subsequent to storing, in the alarms database, the updated alarm configuration file and the association of the updated alarm configuration file with the function block identifier: receiving, via the network, an alarm configuration request that is transmitted by an additional DCN of the process automation system and that includes the function block identifier. In those versions, the method further includes, responsive to receiving the alarm configuration request: retrieving, from the alarms database, the updated alarm configuration file based on the alarm configuration file being stored in association with the function block identifier and the function block identifier being included in the received alarm configuration request; and transmitting, via the network of the process automation system and to the additional DCN, the updated alarm configuration file. Transmitting the updated alarm configuration file causes the additional DCN to implement alarm monitoring that conforms to the updated alarm configuration file. In some of those versions the additional DCN is a newly commissioned DCN that is a replacement for the DCN in the process automation system. In some other of those versions, the additional DCN is a previously commissioned DCN that is executing the function block at a time of the alarm configuration request and the DCN no longer executes the function block at the time of the alarm configuration request.

In some implementations, determining that the DCN is executing the function block of the particular type includes: receiving, via the network, an alarm configuration request that is transmitted by the DCN and that includes a function block identifier of the function block; and determining, based on the function block identifier included in the alarm configuration request, that the DCN is executing the function block of the particular type. In some versions of those implementations, determining, based on the function block identifier included in the alarm configuration request, that the DCN is executing the function block of the particular type includes: determining the particular type based on the function block identifier including one or more characters that are mapped to the particular type. In some additional or alternative versions of those implementations, the method further includes, responsive to receiving the alarm configuration request, determining whether there is any particular alarm configuration file stored in association with the function block identifier in an alarms database. In those additional or alternative versions transmitting the default alarm configuration file to the DCN is further responsive to determining that there is not any particular alarm configuration file stored in association with the function block identifier.

In some implementations, the default alarm configuration file defines one or more conditions to be monitored in implementing alarm monitoring and includes, for each the one or more conditions, a corresponding default value or no value. In some of those implementations, the method further includes identifying the function block executed by the DCN, and determining the default alarm configuration file includes modifying a generic alarm configuration file, for the particular type, to include one or more process variables of the function block executed by the DCN.

In some implementations, a method implemented by hardware processor(s) of a distributed control node (DCN) of a process automation system is provided and includes receiving user interface inputs via a human machine interface (HMI) that directly interfaces with the DCN. The method further includes determining, based on the user interface inputs, one or more updates to a default alarm configuration file that is locally stored at the DCN and that is associated with a function block executed by the DCN. The method further includes generating an updated alarm configuration file that is based on the default alarm configuration file and the one or more determined updates, implementing alarm monitoring based on the updated alarm configuration file and the function block, and transmitting, via a network of the process automation system, an alarm configuration update that includes the updated alarm configuration file and a function block identifier of the function block. Transmitting the request causes the updated alarm configuration file to be stored, in an alarms database, in association with the function block identifier.

These and other implementations of the technology disclosed herein can include one or more of the following features.

In some implementations, determining, based on the user interface inputs, the one or more updates to the default alarm configuration file includes: determining, based on the user interface inputs, a particular value of the one or more updates, wherein the particular value is for a condition of the default alarm configuration file. In some versions of those implementations, the default alarm configuration file lacks any value for the condition and the updated alarm configuration file includes the particular value for the condition. In some other versions of those implementations, the default alarm configuration file includes a default value for the condition and the updated alarm configuration file includes the particular value for the condition.

In some implementations, the method further includes, prior to receiving the user interface inputs via the HMI: transmitting, via the network, an alarm configuration request that includes the function block identifier; and receiving, in response to transmitting the alarm configuration request and via the network, the default alarm configuration file. In some versions of those implementations, the method further includes detecting occurrence of one or more alarm configuration conditions and, in those versions, transmitting the alarm configuration request is responsive to detecting the occurrence of the one or more alarm configuration conditions. In some of those versions, detecting occurrence of the one or more alarm configuration conditions includes: detecting a powering up of the DCN, detecting that the DCN is newly commissioned in the process automation system, and/or detecting that alarm monitoring, by the DCN for the function block, is not currently active.

In some implementations, the function block identifier is specific to the function block and is not assigned to any other function block of the process automation system.

In some implementations, a process automation system is provided that includes an alarms configuration server including: one or more network interfaces communicatively coupled to a network of the process automation system; an alarms database that includes multiple function block specific alarm configuration files and, for each of the function block specific alarm configuration files, a corresponding association to a corresponding function block identifier; and one or more alarm configuration processors. The alarm configuration processor(s) execute stored instructions to: receive, via the network, an alarm configuration request that is transmitted by a node of the process automation system and that includes a function block identifier of the function block and that includes the function block identifier based on the function block being assigned for use in alarm monitoring by the node; determine, based on receiving the alarm configuration request, whether the corresponding associations of the alarms database include any association to the function block identifier; in response to determining that the corresponding associations of the alarms database do include an association to the function block identifier: transmit, to the node responsive to the alarm configuration request, a function block specific alarm configuration file, of the function block specific alarm configuration files, that has the association; and in response to determining that the corresponding associations of the alarms database do not include any association to the function block identifier: determine a default alarm configuration file based on a particular type of a function block identified by the function block identifier; and transmit, via the network and to the node, the default alarm configuration file determined based on the particular type. The default alarm configuration file is locally editable via the node and, when edited, is used by the node in implementing alarm monitoring based on the function block.

What is claimed is:

1. A method implemented by one or more processors, the method comprising:
   determining that a distributed control node (DCN), of a process automation system, is executing a function block of a particular type;
   determining a default alarm configuration file based on the particular type,
      wherein the default alarm configuration file defines one or more conditions to be monitored in implementing alarm monitoring and includes, for each the one or more conditions, a corresponding default value or no value;
   responsive to determining that the DCN is executing the function block of the particular type:
      transmitting, via a network of the process automation system and to the DCN, the default alarm configuration file determined based on the particular type,
      wherein the default alarm configuration file is locally editable via the DCN and, when edited, is used by the DCN in implementing alarm monitoring based on the function block.

2. The method of claim 1, further comprising:
   subsequent to transmitting, to the DCN, the default alarm configuration file for the particular type:
      receiving, via the network and from the DCN, an alarm configuration update that includes:
         a function block identifier of the function block executed by the DCN, and
         an updated alarm configuration file that is an edited version of the previously transmitted default alarm configuration file; and
      storing, in an alarms database, the updated alarm configuration file and an association of the updated alarm configuration file with the function block identifier.

3. The method of claim 2, further comprising:
   subsequent to storing, in the alarms database, the updated alarm configuration file and the association of the updated alarm configuration file with the function block identifier:
      receiving, via the network, an alarm configuration request transmitted by an additional DCN of the process automation system, wherein the alarm configuration request includes:
         the function block identifier;
      responsive to receiving the alarm configuration request:
         retrieving, from the alarms database, the updated alarm configuration file based on the alarm configuration file being stored in association with the function block identifier and the function block identifier being included in the received alarm configuration request; and
         transmitting, via the network of the process automation system and to the additional DCN, the updated alarm configuration file,
            wherein transmitting the updated alarm configuration file causes the additional DCN to implement alarm monitoring that conforms to the updated alarm configuration file.

4. The method of claim 3, wherein the additional DCN is a newly commissioned DCN that is a replacement for the DCN in the process automation system.

5. The method of claim 3, wherein the additional DCN is a previously commissioned DCN that is executing the function block at a time of the alarm configuration request and wherein the DCN no longer executes the function block at the time of the alarm configuration request.

6. The method of claim 1, wherein determining that the DCN is executing the function block of the particular type comprises:
   receiving, via the network, an alarm configuration request that is transmitted by the DCN and that includes a function block identifier of the function block; and
   determining, based on the function block identifier included in the alarm configuration request, that the DCN is executing the function block of the particular type.

7. The method of claim 6, wherein determining, based on the function block identifier included in the alarm configuration request, that the DCN is executing the function block of the particular type comprises:
   determining the particular type based on the function block identifier including one or more characters that are mapped to the particular type.

8. The method of claim 6, further comprising:
   responsive to receiving the alarm configuration request:
      determining whether there is any particular alarm configuration file stored in association with the function block identifier in an alarms database;
      wherein transmitting the default alarm configuration file to the DCN is further responsive to determining that there is not any particular alarm configuration file stored in association with the function block identifier.

9. The method of claim 8, further comprising:
   identifying the function block executed by the DCN;
   wherein determining the default alarm configuration file comprises modifying a generic alarm configuration file, for the particular type, to include one or more process variables of the function block executed by the DCN.

10. A method implemented by one or more processors of a distributed control node (DCN) of a process automation system, the method comprising:
    receiving user interface inputs via a human machine interface (HMI) that directly interfaces with the DCN;
    determining, based on the user interface inputs, one or more updates to a default alarm configuration file that is locally stored at the DCN and that is associated with a function block executed by the DCN;
    generating an updated alarm configuration file that is based on the default alarm configuration file and the one or more determined updates;
    implementing alarm monitoring based on the updated alarm configuration file and the function block;

transmitting, via a network of the process automation system, an alarm configuration update that includes the updated alarm configuration file and a function block identifier of the function block,
    wherein transmitting the alarm configuration update causes the updated alarm configuration file to be stored, in an alarms database, in association with the function block identifier; and prior to receiving the user interface inputs via the HMI:
    transmitting, via the network, an alarm configuration request that includes the function block identifier; and
    receiving, in response to transmitting the alarm configuration request and via the network, the default alarm configuration file.

11. The method of claim 10, wherein determining, based on the user interface inputs, the one or more updates to the default alarm configuration file comprises:
    determining, based on the user interface inputs, a particular value of the one or more updates, wherein the particular value is for a condition of the default alarm configuration file.

12. The method of claim 11, wherein the default alarm configuration file lacks any value for the condition and wherein the updated alarm configuration file includes the particular value for the condition.

13. The method of claim 11, wherein the default alarm configuration file includes a default value for the condition and wherein the updated alarm configuration file includes the particular value for the condition.

14. The method of claim 11, further comprising:
    detecting occurrence of one or more alarm configuration conditions;
    wherein transmitting the alarm configuration request is responsive to detecting the occurrence of the one or more alarm configuration conditions.

15. The method of claim 14, wherein detecting occurrence of the one or more alarm configuration conditions comprises:
    detecting a powering up of the DCN,
    detecting that the DCN is newly commissioned in the process automation system, and/or
    detecting that alarm monitoring, by the DCN for the function block, is not currently active.

16. The method of claim 10, wherein the function block identifier is specific to the function block and is not assigned to any other function block of the process automation system.

17. A process automation system, comprising:
an alarms configuration server including:
    one or more network interfaces communicatively coupled to a network of the process automation system;
    an alarms database that includes multiple function block specific alarm configuration files and, for each of the function block specific alarm configuration files, a corresponding association to a corresponding function block identifier;
    one or more alarm configuration processors executing stored instructions to:
        receive, via the network, an alarm configuration request that is transmitted by a node of the process automation system and that includes a function block identifier of the function block,
        wherein the alarm configuration request includes the function block identifier based on the function block being assigned for use in alarm monitoring by the node;
        determine, based on receiving the alarm configuration request, whether the corresponding associations of the alarms database include any association to the function block identifier;
        in response to determining that the corresponding associations of the alarms database do include an association to the function block identifier:
            transmit, to the node responsive to the alarm configuration request, a function block specific alarm configuration file, of the function block specific alarm configuration files, that has the association; and
        in response to determining that the corresponding associations of the alarms database do not include any association to the function block identifier:
            determine a default alarm configuration file based on a particular type of a function block identified by the function block identifier; and
            transmit, via the network and to the node, the default alarm configuration file determined based on the particular type,
                wherein the default alarm configuration file is locally editable via the node and, when edited, is used by the node in implementing alarm monitoring based on the function block.

18. The process automation system of claim 17, further comprising the node, and wherein the node is a distributed control node (DCN) that executes the function block.

19. A method implemented by one or more processors, the method comprising:
    receiving, via a network, an alarm configuration request that is transmitted by a distributed control node (DCN) of a process automation system and that includes a function block identifier of the function block;
    determining, based on the function block identifier included in the alarm configuration request, that the DCN is executing a function block of a particular type,
        wherein determining, based on the function block identifier included in the alarm configuration request, that the DCN is executing the function block of the particular type comprises:
            determining the particular type based on the function block identifier including one or more characters that are mapped to the particular type;
    determining a default alarm configuration file based on the particular type;
    responsive to determining that the DCN is executing the function block of the particular type:
        transmitting, via a network of the process automation system and to the DCN, the default alarm configuration file determined based on the particular type,
            wherein the default alarm configuration file is locally editable via the DCN and, when edited, is used by the DCN in implementing alarm monitoring based on the function block.

20. The method of claim 19, further comprising:
responsive to receiving the alarm configuration request:
    determining whether there is any particular alarm configuration file stored in association with the function block identifier in an alarms database;
    wherein transmitting the default alarm configuration file to the DCN is further responsive to determining that there is not any particular alarm configuration file stored in association with the function block identifier.

* * * * *